(12) United States Patent
Anderson et al.

(10) Patent No.: US 12,067,962 B2
(45) Date of Patent: Aug. 20, 2024

(54) SYSTEMS AND METHODS FOR DEWATERING SLURRIES

(71) Applicant: Vermeer Manufacturing Company, Pella, IA (US)

(72) Inventors: Gregory Anderson, Pella, IA (US); Brandon Storm, Reasnor, IA (US); Andrew Strobel, Knoxville, IA (US); Corey Lanoue, Pella, IA (US); Tayte Askelsen, Pella, IA (US); Samuel Edmund Whittome, Cambridge (GB); Ross Peter Jones, Cambridge (GB)

(73) Assignee: Vermeer Manufacturing Company, Pella, IA (US)

( * ) Notice: Subject to any disclaimer, the term of this patent is extended or adjusted under 35 U.S.C. 154(b) by 637 days.

(21) Appl. No.: 17/258,342

(22) PCT Filed: Jul. 18, 2018

(86) PCT No.: PCT/US2018/042592
§ 371 (c)(1),
(2) Date: Jan. 6, 2021

(87) PCT Pub. No.: WO2020/013870
PCT Pub. Date: Jan. 16, 2020

(65) Prior Publication Data
US 2021/0269331 A1    Sep. 2, 2021

Related U.S. Application Data

(63) Continuation-in-part of application No. PCT/US2018/041647, filed on Jul. 11, 2018.
(Continued)

(51) Int. Cl.
*G10K 1/066* (2006.01)
*C02F 1/52* (2023.01)
(Continued)

(52) U.S. Cl.
CPC ............ *G10K 1/066* (2013.01); *C02F 1/5209* (2013.01); *C02F 1/5236* (2013.01); *C02F 1/56* (2013.01);
(Continued)

(58) Field of Classification Search
CPC ............... G01N 29/032; G01N 29/036; G01N 2015/0003; G01N 2015/0092;
(Continued)

(56) References Cited

U.S. PATENT DOCUMENTS 3,133,445 A * 5/1964 Richard ................ G01N 29/11
367/87
3,779,070 A   12/1973 Cushman et al.
(Continued)

FOREIGN PATENT DOCUMENTS

DE       3319922 A    12/1984
JP    2001303887 A    10/2001
(Continued)

OTHER PUBLICATIONS

Arimura et al, JP 2014054603A, English machine translation, pp. 1-9 (Year: 2012).*
(Continued)

*Primary Examiner* — Claire A Norris
(74) *Attorney, Agent, or Firm* — Armstrong Teasdale LLP

(57) ABSTRACT

Systems and methods for dewatering slurries having relatively high solids content such as earthen slurries are disclosed. In some embodiments, one or more transducer devices configured for acoustic spectroscopy and/or electroacoustic spectroscopy are used to determine a parameter related to the particle size distribution (e.g., specific surfaced area) and/or zeta potential of the slurry.

19 Claims, 24 Drawing Sheets

Related U.S. Application Data

(60) Provisional application No. 62/696,201, filed on Jul. 10, 2018.

(51) Int. Cl.

| | |
|---|---|
| *C02F 1/56* | (2023.01) |
| *C02F 11/121* | (2019.01) |
| *C02F 11/14* | (2019.01) |
| *C02F 11/143* | (2019.01) |
| *C02F 11/147* | (2019.01) |
| *C02F 11/148* | (2019.01) |
| *C02F 103/10* | (2006.01) |
| *G01N 15/02* | (2024.01) |
| *G01N 29/032* | (2006.01) |
| *G01N 29/24* | (2006.01) |

(52) U.S. Cl.
CPC ............ *C02F 11/121* (2013.01); *C02F 11/14* (2013.01); *C02F 11/143* (2019.01); *C02F 11/147* (2019.01); *G01N 15/02* (2013.01); *G01N 29/032* (2013.01); *G01N 29/2437* (2013.01); *C02F 11/148* (2019.01); *C02F 2103/10* (2013.01); *C02F 2209/105* (2013.01); *G01N 2291/015* (2013.01); *G01N 2291/02416* (2013.01); *G01N 2291/101* (2013.01)

(58) Field of Classification Search
CPC .. G01N 15/02; G01N 15/0266; C02F 1/5209; C02F 2209/11; C02F 2209/003; C02F 11/14; C02F 11/143
USPC ............................... 73/61.75; 210/709, 745
See application file for complete search history.

(56) References Cited

U.S. PATENT DOCUMENTS

| | | | |
|---|---|---|---|
| 4,294,656 A | | 10/1981 | Beck et al. |
| 4,497,208 A | | 2/1985 | Oja et al. |
| 4,855,061 A | * | 8/1989 | Martin .................. C02F 1/5209 210/709 |
| 4,950,908 A | | 8/1990 | Oblad et al. |
| 5,164,094 A | | 11/1992 | Stuckart |
| 5,601,704 A | | 2/1997 | Salem et al. |
| 5,846,433 A | * | 12/1998 | Sorensen .............. C02F 11/147 210/709 |
| 6,109,098 A | * | 8/2000 | Dukhin .................. G01N 29/42 73/865.5 |
| 6,449,563 B1 | | 9/2002 | Dukhin et al. |
| 9,486,647 B2 | | 11/2016 | Bergfjord et al. |
| 2006/0027015 A1 | | 12/2006 | Tavlarides et al. |
| 2011/0284475 A1 | | 11/2011 | Kolodny |
| 2012/0111117 A1 | | 5/2012 | Prakash et al. |
| 2013/0220922 A1 | | 8/2013 | Joensuu et al. |

FOREIGN PATENT DOCUMENTS

| | | |
|---|---|---|
| JP | 2003202327 A | 7/2003 |
| JP | 2009039683 A | 2/2009 |
| JP | 2014054603 A | 3/2014 |
| KR | 101409043 B1 | 6/2014 |
| RU | 2618007 C1 | 5/2017 |
| WO | 9743027 A1 | 5/1997 |
| WO | 2018132306 A1 | 7/2018 |

OTHER PUBLICATIONS

Harsha Ratnaweera and Joachim Fettig, "State of the Art of Online Monitoring and Control of the Coagulation Process", www.mdpi.com/journal/water, ISSN 2073-4441, pp. 6575-6597, (2015).

Ana Morfesis, PhD., "Process Optimization Using On-line Continuous Zeta Potential Monitoring", Water System Optimization Conference, Hershey, PA, Oct. 30, 2015.

International Search Report for application PCT/US2018/41647, Nov. 9, 2018, 14 pages.

International Search Report for application PCT/2018/42592, Nov. 15, 2018, 11 pages.

* cited by examiner

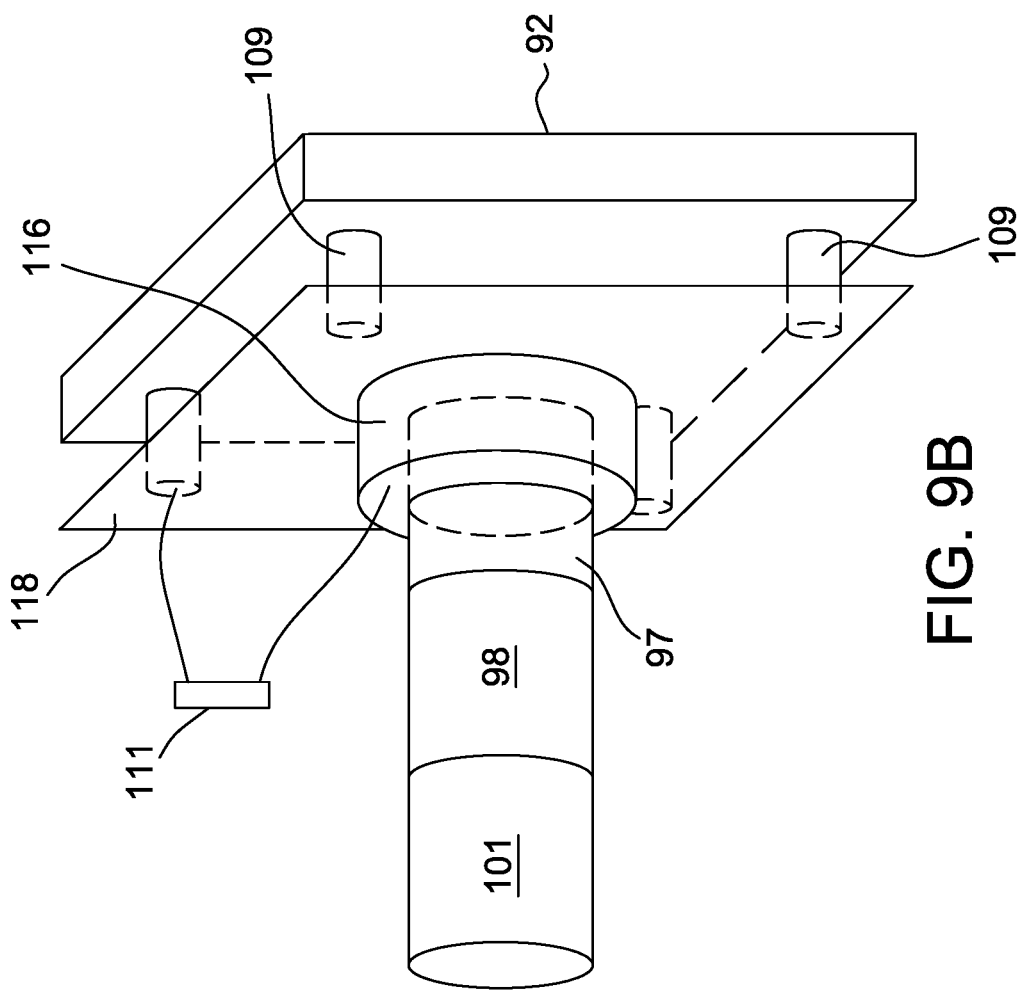

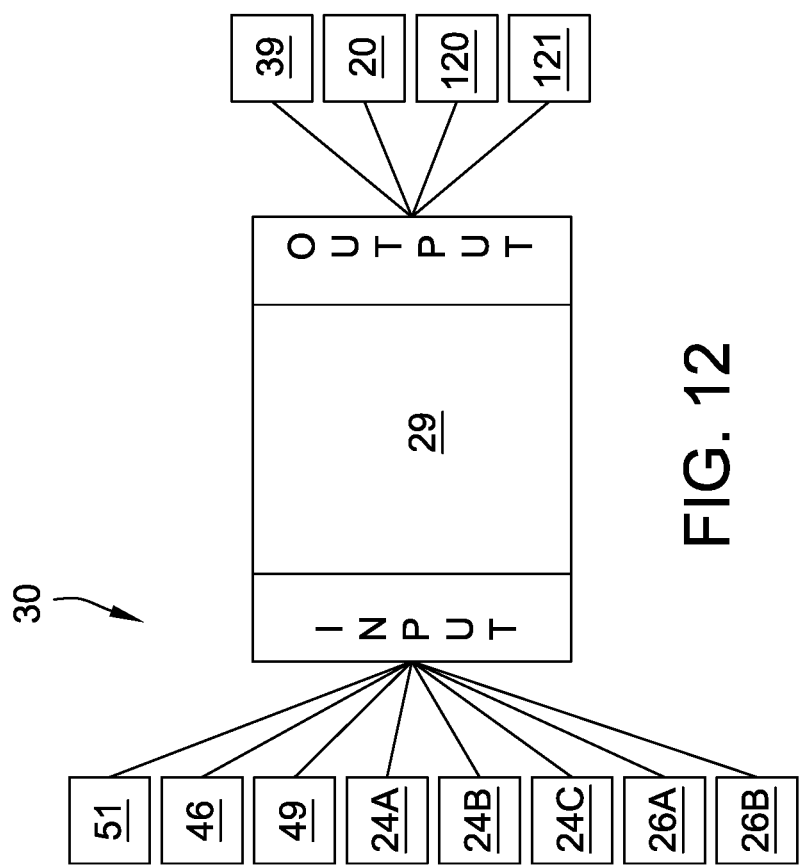

SYSTEMS AND METHODS FOR DEWATERING SLURRIES

CROSS-REFERENCE TO RELATED APPLICATIONS

This application is the 35 U.S.C. 371 national stage of International Application No. PCT/US2018/042592, filed Jul. 18, 2018, which claims the benefit of U.S. Provisional Application No. 62/696,201, filed Jul. 10, 2018, and claims priority to PCT/US2018/041647, filed Jul. 11, 2018. Each application is incorporated herein by reference in its entirety.

FIELD OF THE DISCLOSURE

The field of the disclosure relates to systems and methods for dewatering slurries such as slurries having relatively high solids content such as earthen slurries. In some embodiments, acoustic and/or electroacoustic properties of the slurry are monitored by one or more transducer devices to control addition of additives such as coagulant and/or flocculant.

BACKGROUND

Various subsurface infrastructure such as power cables, water lines, gas lines, and product piping may be installed by drilling operations. Horizontal directional drilling is a trenchless drilling technique often used in urban areas and for crossing below roads or waterways. Drilling involves formation of a pilot hole along the drill path. The pilot hole is often reamed out to the size of the utility. During drilling, a viscous drilling fluid that typically contains bentonite or polymer is pumped to the cutting head. The drilling fluid, for example, cools the cutting head and carries drill cuttings away from the drill head through the drill bore. Spent drilling fluid may be collected by use of vacuum excavators. Such vacuum excavators may also collect fluid from vertical well drilling.

Vacuum excavators are also used in a process commonly referred to as "potholing", "daylighting" or "locating." Potholing involves use of high pressure water that loosens soil to create a hole to visually locate utilities. The mud slurry that is produced is removed by a vacuum and sent to a spoil tank. High pressure systems may also be used to cut trenches with the resulting slurry being sent to a spoil tank of a vacuum excavator. Vacuum excavators may also be used to remove water/mud slurries from valve and meter boxes to provide access to the boxes.

The raw slurry produced during drilling or potholing, typically collected by vacuum excavators, is conventionally landfilled or dumped at a designated disposal site. Landfill disposal of slurries containing a large amount of water may be relatively expensive compared to disposal of solids alone. It is advantageous to remove as much water as possible from the slurry in order to reduce disposal weight and/or volume and to reduce fresh water use. Further, tightening regulations may limit disposal options for such slurries. The relatively high solids content of slurries prohibits their disposal in water treatment facilities, even after the slurry is pretreated to remove larger solids from the slurry.

A need exists for dewatering systems and methods for processing earthen slurries such as drill cuttings and cuttings from potholing that optionally allow the separated water to be recycled by reuse. A need exists for systems and methods that allow suspended solids to be removed from slurries with automated dosing of additives with relatively quick feedback.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

One aspect of the present disclosure is directed to a system for dosing a slurry to remove suspended solids. The system includes a dosing vessel for adding an additive to the slurry. One or more transducer devices generate an acoustic wave that is transferred to the slurry. The one or more transducer devices detect (1) an acoustic property of the slurry and (2) an electroacoustic property of the slurry. The system includes an additive control system for controlling the dose of one or more additives added to the dosing vessel. The additive control system includes an additive feed system for introducing the additive to the dosing vessel. The additive control system includes a controller configured to control the dose of additive added to the dosing vessel from the additive feed system based at least in part on (1) the acoustic property of the slurry and (2) the electroacoustic property of the slurry.

Another aspect of the present disclosure is directed to a system for dosing a slurry to remove suspended solids. The system includes a dosing vessel for adding a coagulant to the slurry. A first transducer device generates a first acoustic wave in the slurry at a first center frequency and measures attenuation of the first acoustic wave. A second transducer device generates a second acoustic wave in the slurry at a second center frequency and measures attenuation of the second acoustic wave. The first center frequency is different from the second center frequency. The system includes a coagulant control system for controlling a dose of coagulant added to the dosing vessel. The coagulant control system includes a coagulant feed system for introducing coagulant to the dosing vessel. The coagulant control system also includes a controller configured to control the dose of coagulant added to the dosing vessel from the coagulant feed system based at least in part on the attenuation of the first and second acoustic waves sensed by the first and second transducer devices.

Yet another aspect of the present disclosure is directed to a system for dewatering earthen slurries. The system includes a pretreatment system for removing an initial amount of solids from the earthen slurry to produce pretreated slurry. The system includes a dilution system for adding water to the pretreated slurry to produce a diluted slurry. The system includes a dosing system for adding an additive to the diluted slurry. The dosing system includes a pipe flocculator through which the slurry passes and an additive control system for adding an additive to the pipe flocculator to form an additive-treated slurry. The system for dewatering earthen slurries comprises a separation system comprising one or more devices for separating solids from the additive-treated slurry.

A further aspect of the present disclosure is directed to a method for dewatering earthen slurries. The method includes introducing slurry into a pretreatment system to remove an initial amount of solids from the slurry and produce a solids-depleted slurry. Slurry is introduced into a pipe flocculator. Coagulant is added to the slurry. The dose of coagulant added is based at least in part on (1) an acoustic property of the slurry or (2) an electroacoustic property of the slurry. Flocculant is added to the slurry. The dose of flocculant added is based at least in part on at least one of (1) an acoustic property of the slurry and (2) an electroacoustic property of the slurry.

Yet another aspect of the present disclosure is directed to a transducer device for measuring colloidal vibration current (CVI) of a slurry. The transducer device includes a piezoelectric transducer for generating an acoustic wave. The device includes a delay rod for transferring the acoustic wave to the slurry and a buffer rod for transferring the acoustic wave to the slurry. The buffer rod has an acoustic impedance that more closely matches an acoustic impedance of the slurry relative to an acoustic impedance of the delay rod. The delay rod is disposed between the piezoelectric transducer and the buffer rod. The device includes an electrode that contacts the slurry. The electrode is disposed on an end of the buffer rod. The electrode is made of titanium.

Yet a further aspect of the present disclosure is directed to a transducer device for measuring an acoustic or electroacoustic property of a slurry. The device includes a piezoelectric transducer for generating an acoustic wave. The device includes a delay rod for transferring the acoustic wave to the slurry. The delay rod has a knurled surface. The device includes a buffer rod for transferring the acoustic wave to the slurry. The buffer rod has an acoustic impedance that more closely matches an acoustic impedance of the slurry relative to an acoustic impedance of the delay rod. The delay rod is disposed between the piezoelectric transducer and the buffer rod.

Another aspect of the present disclosure is directed to a transducer device for measuring an acoustic or electroacoustic property of a slurry. The device includes a piezoelectric transducer for generating an acoustic wave and a delay rod for transferring the acoustic wave to the slurry. The device includes a buffer rod for transferring the acoustic wave to the slurry. The buffer rod has an acoustic impedance that more closely matches an acoustic impedance of the slurry relative to an acoustic impedance of the delay rod. The delay rod is disposed between the piezoelectric transducer and the buffer rod. A wiper assembly moves across a face of the transducer device to bring fresh slurry in contact with the transducer device.

A further aspect of the present disclosure is directed to a method for automatically dosing a slurry flowing through a vessel with coagulant. One or more acoustic pulses are generated in the slurry by a transducer device. A colloidal vibration current produced in the slurry after generation of the acoustic pulse is measured. The specific surface area of the slurry is determined based on one or more measured acoustic parameters of the slurry after generation of the acoustic pulse. A zeta potential of the slurry is calculated based on, at least in part, the colloidal vibration current. Coagulant is added to the slurry. A rate at which coagulant is added to the slurry is based at least in part on (1) the calculated zeta potential and (2) the specific surface area of the slurry.

Yet another aspect of the present disclosure is directed to a method for automatically dosing a slurry flowing through a vessel with coagulant. One or more acoustic pulses are generated in the slurry by a first transducer device. A first colloidal vibration current produced in the slurry after generation of the acoustic pulse is measured. A first zeta potential of the slurry is calculated based on, at least in part, the first colloidal vibration current. Coagulant is added to the slurry downstream of the first transducer device. One or more acoustic pulses in the slurry are generated by a second transducer device that is downstream of coagulant addition. A second colloidal vibration current produced in the slurry after generation of the acoustic pulse from the second transducer is measured. A second zeta potential of the slurry is calculated based on, at least in part, the second colloidal vibration current. A rate at which coagulant is added to the slurry is based at least in part on (1) the calculated first zeta potential and (2) the calculated second zeta potential.

Yet a further aspect of the present disclosure is directed to a method for automatically dosing a slurry flowing through a vessel or in a batch tank with coagulant. A first acoustic wave is generated in the slurry at a first center frequency. One or more acoustic parameters of the slurry are measured after generation of the first acoustic wave. A second acoustic wave is generated in the slurry at a second center frequency. The second center frequency is different from the first center frequency. One or more acoustic parameters of the slurry after generation of the second acoustic wave is measured. An additive is added to the slurry. A dose of additive added is based at least in part on (1) the acoustic parameter measured after generation of the first acoustic pulse and (2) the acoustic parameter measured after generation of the second acoustic pulse.

A further aspect of the present disclosure is directed to a system for measuring (1) an electroacoustic property of a slurry and (2) conductivity of the slurry. The system includes a piezoelectric transducer for generating an acoustic wave. The system includes a delay rod for transferring the acoustic wave to the slurry and a buffer rod for transferring the acoustic wave to the slurry. The delay rod is disposed between the piezoelectric transducer and the buffer rod. The system includes a circuit that includes an electrode for contacting the slurry. The circuit includes a voltage source and a sense resistor connected to the electrode and voltage source. The circuit includes a switch. The system includes a controller that opens and closes the switch to selectively power the voltage source.

Yet a further aspect of the present disclosure is directed to a method of automatically dosing a slurry with a coagulant. A sensing system that contains an electrode and that is grounded to the slurry along with a sense resistor is used to measure a first colloidal vibration current resulting from transmission of an acoustic wave through the slurry. A first zeta potential of the slurry is calculated based at least in part the measured first colloidal vibration current. A first dose of a coagulant is added to the slurry. A sensing system that contains an electrode and that is grounded to the slurry along with a sense resistor is used to measure a second colloidal vibration current resulting from transmission of an acoustic wave through the slurry. A second zeta potential is calculated based at least in part on the measured second colloidal vibration current. A second dose of a coagulant is added to the slurry. The amount of the second dose is based at least in part on the first calculated zeta potential and the second calculated zeta potential.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

FIG. 9B is a perspective view of a transducer device in which the reflector is an electrode;

FIG. 12 is a schematic of a control system for controlling slurry dilution and for dosing of additives added to the slurry;

DETAILED DESCRIPTION

Figure 1:
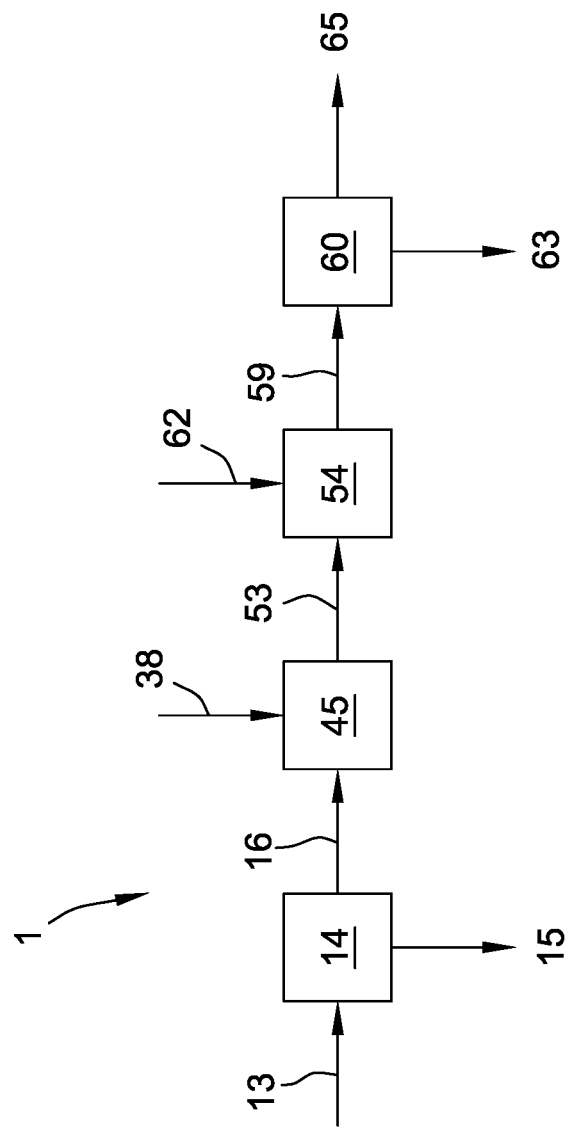
FIG. 1 is a schematic of a system for dewatering an earthen slurry.

An example system 1 for dewatering an earthen slurry 13 is shown in FIG. 1. The earthen slurry 13 is processed in a pretreatment system 14 for receiving the slurry and for removing a first portion of solid particles such as stones, sticks, soil clumps, clay or the like from the slurry 13. The pretreated slurry 16 is introduced into a dilution system 45.

Figure 2:
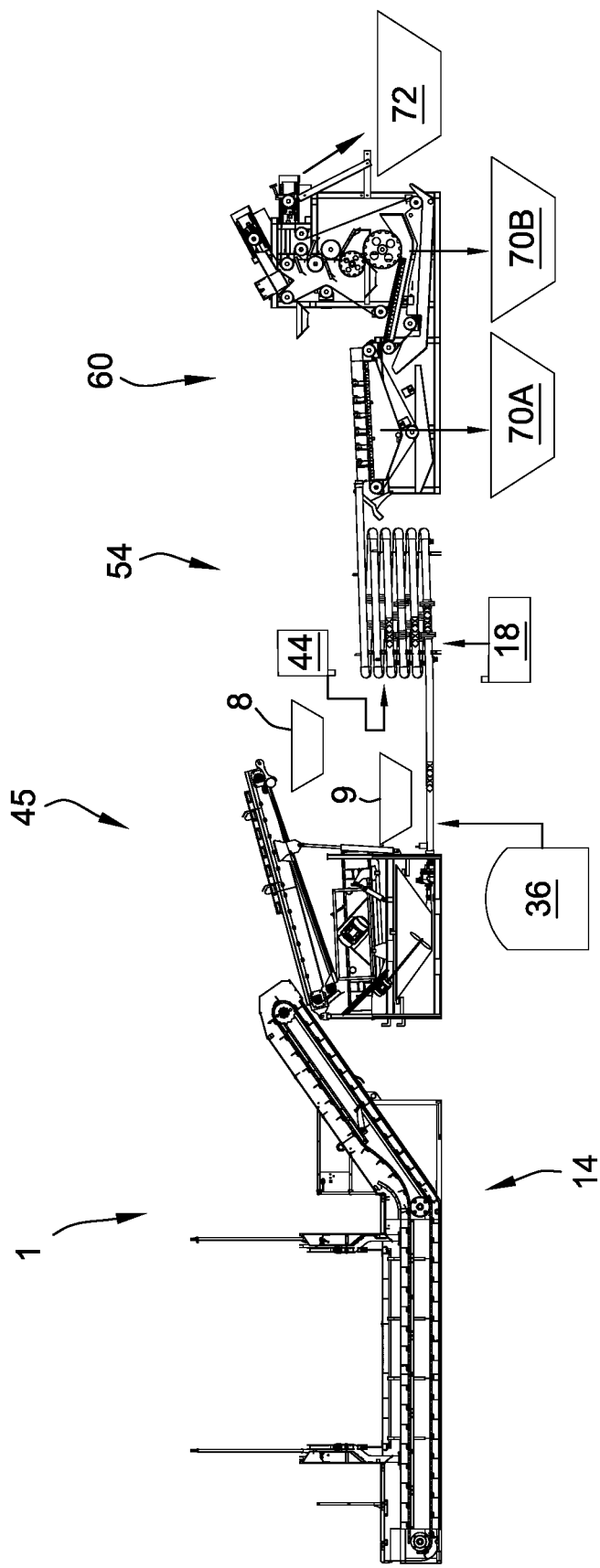
FIG. 2 is a side view of the system.

The pretreated slurry is diluted such as with dilution water 38 in the dilution system 45. The diluted slurry 53 is introduced into a dosing system 54 in which one or more additives 62 are added to the diluted slurry. The dosing system 54 may incorporate one or more mixing devices to distribute additive (s) throughout the slurry and/or to cause suspended solids to aggregate to form flocs. The additive-treated slurry 59 is introduced into a separation system 60 to remove a solid fraction 63 from the slurry 59 and produce a treated liquid fraction 65. An example system 1 for dewatering the earthen slurry is shown in FIG. 2 and further described below.

Earthen slurries 13 that may be processed in the system 1 include slurries of earth and water such as cuttings from a drill site (vertical drill or horizontal drill site) or from potholing, hydro-excavation trenching and/or from other excavation or mining sites in which earthen solids suspended in water are involved. Such slurries may be transported and offloaded from vehicles known in the art as vacuum excavators and, particularly, hydro excavators.

The earthen slurry that is pretreated may include water and earth that was loosed during drilling/potholing or a mining operation. The slurry may also include various additives that are added to the water for drilling purposes (e.g., to modify the viscosity of the fluid) such as bentonite and/or polymers. The slurry may include at least about 10 wt % solids, at least about 30 wt % solids or even at least about 50 wt % solids (e.g., from about 10 wt % to about 80 wt % solids or from about 30 wt % to about 80 wt % solids).

The dewatering system 1 may be configured to be a mobile system that allows the system to be transported to various sites such as a central location between drilling sites. The system may have a common frame or skid that supports one or more of the pretreatment system 14, dilution system 45, dosing system 54 and/or separation system 60. Portions of the system 1 may include skids, rollers or legs which may be vertically extended (not shown) to allow the system to be pulled or lifted onto a transport vehicle (e.g., trailer). In other embodiments, the system includes ground-engaging wheels (or even tracks) for moving the system (e.g., is mounted to a trailer for transport). In other embodiments, the system is fixed at a site (i.e., is not mobile or arranged for disassembly and transport) and slurry (e.g., earthen slurry) is transported to the system without transport of the system during its lifespan.

Pretreatment

The earthen slurry 13 is introduced into a pretreatment system 14 to remove a first portion of solid particles 15 such as larger particles or clumps that are capable of settling in the slurry. The pretreatment system 14 may include various mechanical separation units that separate solids from the slurry by size or weight. Exemplary processing units that may be used include, for example, screens, shakers, stationary or vibrating grates, centrifuges and the like. An exemplary pretreatment system that may be used is disclosed in U.S. Patent Publication No. 2018/0071662 entitled "Systems and Methods for Processing Earthen Slurries", which is incorporated herein by reference for all relevant and consistent purposes. After pretreatment, the pretreated slurry 16 is depleted of solids relative to the earthen slurry 13.

Figure 3:
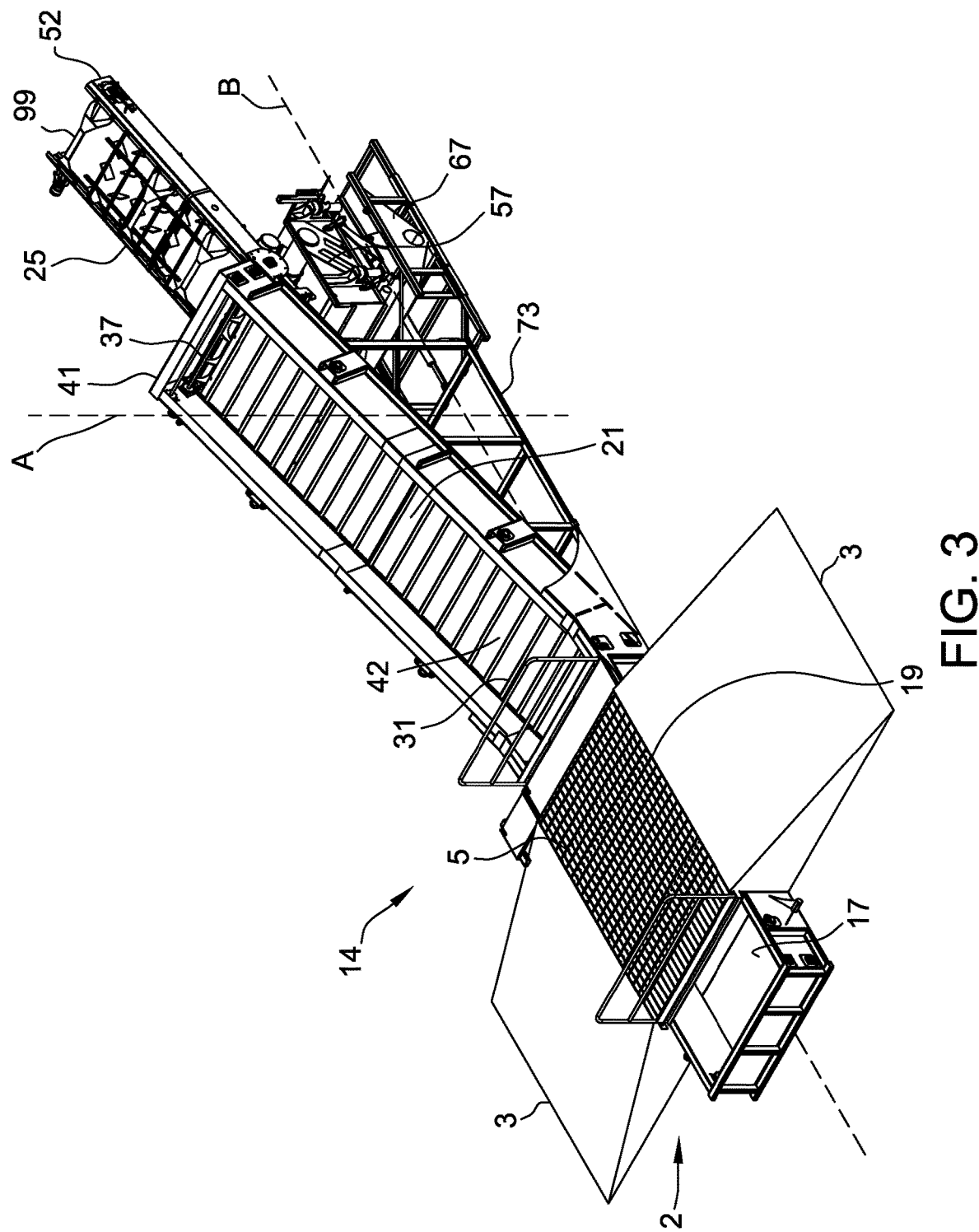
FIG. 3 is a perspective view of a pretreatment system.

An example pretreatment system 14 is shown in FIG. 3. The pretreatment system 14 of the illustrated embodiment includes a dumping station 2 for receiving earthen slurry. The dumping station 2 includes ramps 3 and a platform 5 having grates 19 for receiving earthen slurry from transport vehicles such as vacuum excavators (not shown). Earthen material may be offloaded from the transport vehicle through the grates 19 and into a holding tank 17. In some embodiments, the platform 5 may swing open and slurry may pass directly from the transport vehicle into the holding tank 17. An example dumping station having a platform that swing open is disclosed in U.S. Patent Publication No. 2018/0072516 entitled "Transfer Systems for Receiving and Conveying Material", which is incorporated herein by reference for all relevant and consistent purposes.

The dumping station 2 includes a conveyor 21 configured for removing slurry from the holding tank 17 and moving slurry toward a first separation unit 25. In the illustrated embodiment, the conveyor 21 is a drag-slat conveyor that lifts and conveys slurry forward. Drag-slat conveyors use a number of slats 31 (which may also be referred to as "bars" or "flights") to drag slurry along the floor of the holding tank 17 and up the floor 42 of the conveyor. In some embodiments, the drag-slat conveyor 21 and holding tank 17 are part of the same unit, i.e., are integrally connected. As shown in FIG. 3, the conveyor 21 is angled to move the material vertically (relative to vertical axis A) and horizontally (relative to longitudinal axis B) toward a discharge end 41 of the conveyor 21. Material is expelled from the conveyor 21 through a discharge 37.

In some embodiments, the pretreatment system 14 receives material from a drilling site (e.g., from a wellbore) without use of transport vehicles such as by pumping the earthen slurry 13 to the system.

The first separation unit 25 angles upward toward a back end 52 of the pretreatment system 14 (i.e., towards the discharge end of the unit 25) to promote separation of liquid from the slurry. The first separation unit 25 has mesh openings that act to separate the solid fraction from the liquid fraction. The first separation unit 25 may remove larger solids and un-hydrated soil clumps which helps prevent downstream separation units from blinding (e.g., pluggage of mesh openings) and abrasive wear and damage. As shown in FIG. 3 and in accordance with some embodiments of the present disclosure, the first separation unit 25 is a flat wire belt conveyor. Such flat wire belt conveyors may include spaced wires or rods which form an open mesh in the belt that allow for liquids and particles that fit through the mesh openings to pass through the mesh. In various embodiments, the mesh size of the belt may be from about 0.25 cm to about 5 cm or from about 0.5 cm to about 3 cm. Liquid and small solids that pass through the mesh falls to a conveyor floor and moves toward the liquid discharge end of the separation unit 25. Solids that do not pass through the openings are carried forward by the belt toward solids discharge 99 and fall into a collection vessel 8 (FIG. 2).

Figure 4:
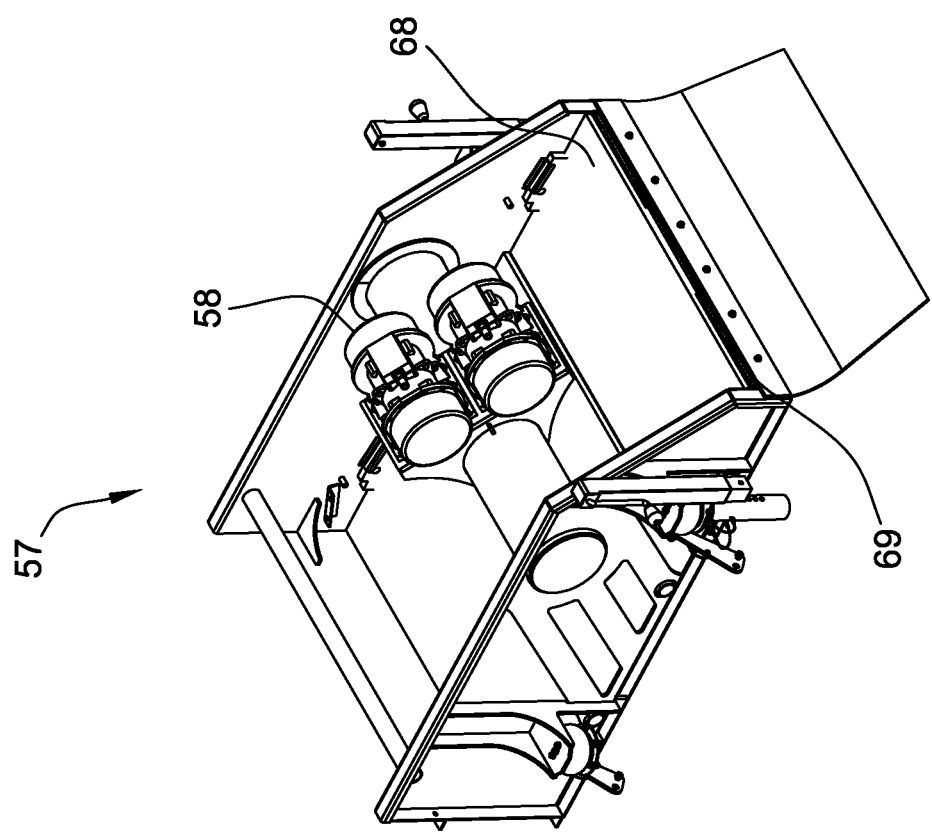
FIG. 4 is a perspective view of a vibratory screen unit of the pretreatment system.

The effluent from the first separation unit 25 that passes through the unit is discharged into a second separation unit 57 (FIG. 3). In the illustrated embodiment, the second separation unit 57 is a vibratory screen unit, more commonly referred to as a "shaker", that includes screen openings to further separate a liquid fraction from the solid fraction in the effluent discharged from the first separation unit 25. In some embodiments, the mesh size of the screen may be from about 45 μm to about 500 μm. The shaker 57 includes vibratory motors 58 (FIG. 4) that cause the screen 68 to vibrate. In some embodiments, the screen 68 is divided into multiple segments that can separately be changed out of the unit 57 for maintenance. As the screen 68 vibrates, effluent falls through openings within the screens 68 and particles that do not fit through the openings vibrate to the discharge end 69 of the unit 57. The shaker 57 may be tilted forward or backward to modify the distribution of materials that pass through the screen and those that vibrate off the screen. In this regard, solids may be capable of moving up the screen when tilted back (i.e., move vertically upward) due to the vibratory action of the screen.

Solids that reach the discharge end 69 of the second separation unit 57 fall into a second collection vessel 9 (FIG. 2). The first and second collection vessels 8, 9 may be any vessel that is suitable for storing solids and which allows the solids to be transported (e.g., bin, dumpster, loader bucket, ground pile, roll-off bin, dump truck or the like). In the case of drilling and/or potholing, the solids in the first and/or second collection vessels 8, 9 may be disposed by re-use in construction or may be landfilled.

The openings of the first separation unit 25 are generally larger than the openings of the second separation unit 57 such that the second separation unit 57 separates finer solids. The solids removed in the second separation unit 57 may include sand, medium-sized solid clods, gravel, sticks grass and the like.

The second effluent that passes through the openings of the second separation unit 57 is collected in a collection system having a collection vessel 67 (FIG. 3). The pretreatment system 14 provides a flow of pretreated slurry 16 to the collection vessel 67 and may operate in batch mode (e.g., providing fluid to the collection tank without continually drawing fluid away from the collection tank) or in a continuous mode in which fluid is transported from the collection vessel 67 for processing while operating the pretreatment system 14 to add pretreated slurry 16 to the vessel 67.

The pretreatment system 14 of FIG. 3 is exemplary and may include various modifications and additional processing and unit operations unless stated otherwise. Generally, the pretreatment system 14 may include any unit or combination of units that separate at least a portion of solids such as screens, centrifuges, hydrocyclones and the like unless stated otherwise. For example, the pretreatment system 14 may include a pre-screen or "grizzly" that removes large solids to prevent such solids from impacting the vibratory screen 68 (FIG. 4) of the shaker 57. In some instances, the first separation unit 25 is a pre-screen (e.g., and not a flat-wire belt conveyor).

In some embodiments, the pretreatment system 14 (or portions thereof) is eliminated and slurry is received from a transport vehicle or from a drill site and is directly introduced into the dilution system 45 (e.g., into a collection vessel from which the dilution system 45 pulls slurry).

Dilution Control

Figure 5:
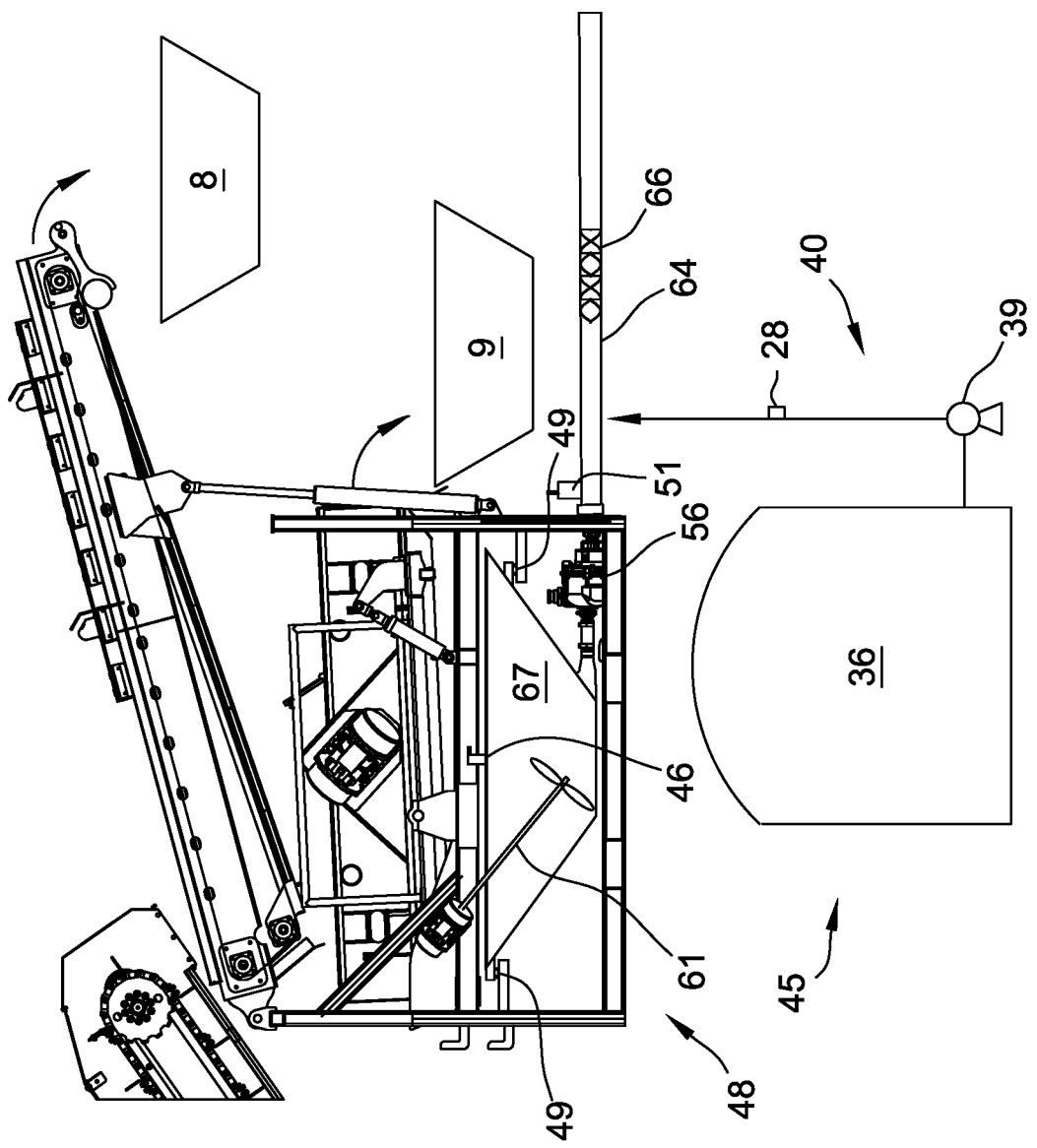
FIG. 5 is side view of a dilution system for adding water to the pretreated slurry.

Referring now to FIG. 5, an example dilution system 45 is shown. Water is added to the pretreated slurry by a water feed system 40 to dilute the slurry to a preferred solids content. The water feed system 40 includes a water feed tank 36, water feed system 39, shown as a pump, and flow meter 28. One or more sensors are configured (e.g., communicatively connected) with a controller 29 (FIG. 12) to achieve a consistent solids content (e.g., solids content below a threshold) in the slurry that is processed downstream in the dosing system.

Pretreated slurry is discharged from the pretreatment system 14 and introduced into the collection vessel 67. The dilution system 45 includes a sensor system 48 that provides information related to the solids content of the slurry after pretreatment. In the illustrated embodiment, the sensing system 48 includes a level sensor 46 and load cells 49. The level sensor 46 may be used to determine the total volume of pretreated slurry in the collection vessel 67 and the load cells 49 may be used to determine the weight of the slurry. The measured and/or calculated volume and weight are used to determine the specific gravity (i.e., density) of the slurry and/or the solids content of the slurry (i.e., solids concentration).

In some embodiments, the collection vessel 67 feeds a separate buffer tank. The slurry within the buffer tank (as in batch dilution) or discharged from the buffer tank (as in a continuous system) may be diluted. The sensor system 48 may detect the solids content of the slurry in the buffer tank.

The sensor system 48 includes a flow sensor 51 that measures the volume or mass of pretreated slurry discharged from the collection vessel 67 by slurry pump 56. The flow rate of slurry may be controlled based on a target flow rate for additive addition (e.g., target flow rate for a pipe flocculator) or based on level control. The flow rate sensed by the flow sensor 51 and the specific gravity or solids concentration as determined by the load cells 49 and level sensor 46 may be used to control the amount of water used for dilution such as through control of water feed pump 39. A mixing system 61 (e.g., paddle mixer) may mix the slurry in the collection vessel 67 such that the slurry in the vessel 67 is relatively uniform (e.g., uniform distribution of suspended solids). Alternatively or in addition to a mechanical mixing device such as a paddle mixer, the mixing system may include one or more recirculation loops that assist in mixing of the vessel 67.

An example flow sensor 51 is a Coriolis sensor that operates to measure the mass flow rate. Such Coriolis sensors may also measure fluid density. In such embodiments, the load cells may be eliminated. Other alternatives to load cells include use of one or more oscillating u-tubes.

In the illustrated embodiment, the sensor system 48 includes load cells 49, a level sensor 46 and a flow sensor 51 for dilution control. Generally, the system may include any sensor or combination of sensors that are configured in a suitable manner that provides information related to the solids content of the pretreated slurry. The sensors are generally configured with the controller 29 (FIG. 12) to determine the rate of water addition to achieve the predetermined density of the diluted slurry. Such sensors may detect the specific gravity (i.e., density) of the slurry, solids content of the slurry (i.e., solids concentration) and/or the flow rate of the slurry (e.g., volumetric or mass).

Dilution water is introduced into a pretreatment slurry transfer conduit 64 where dilution water mixes with the pretreated slurry to form the diluted slurry with the predetermined density or solids concentration. A flow meter 28 may measure the flow rate of water added to the transfer conduit. The diluted slurry continues to mix in the conduit and further mixing may be promoted by use of one or more static mixers 66.

The dose (i.e., rate) of water added may be based on a desired solids concentration of the slurry which is treated in the dosing system (i.e., to lower the solids concentration to or below a threshold). Generally, earthen slurries with a higher solids content will use more dilution water to achieve the desired solids concentration and more dilute earthen slurries will use less dilution water. In various embodiments, water may be added to dilute the slurry such that the slurry has less than about 60 wt % solids, less than about 50 wt % solids or less than about 40 wt % solids (e.g., from about 20 wt % to about 60 wt % or from about 20 wt % to about 40 wt % solids). In other embodiments, the slurry is not diluted (i.e., no water is added to the slurry after pretreatment).

The dilution system 45 of the illustrated embodiment is a continuous system in which dilution water is added to a continuous flow of pretreated slurry. Other dilution systems may operate in batch and/or semi-continuous modes (e.g., a continuous-batch mode). In a batch mode, the specific gravity and/or solids content of the slurry in a batch vessel (e.g., collection vessel 67 or other vessel) is determined, water is added to the vessel (and mixed with a mixing system such as a paddle mixer or roll-jet) to produce the diluted slurry at the predetermined density. The diluted slurry is discharged and introduced into the downstream dosing system. In a continuous-batch mode, two or more batch tanks may be used. Upon filling of a first batch tank, the tank may be diluted to the predetermined solids concentration and the diluted slurry may be discharged to the dosing system. The second batch tank may be filled with pretreated slurry while the first batch tank is diluted and/or discharged. The first and second tanks are filled, diluted and emptied in continuous cycles. In this manner, a continuous feed of diluted slurry may be introduced into the dosing system. Such batch systems may perform both dilution and dosing control of additive (e.g., coagulant) as shown in FIGS. 13B and 13C and further described below.

Dosing Control and Arrangement of Transducer Devices

Figure 6:
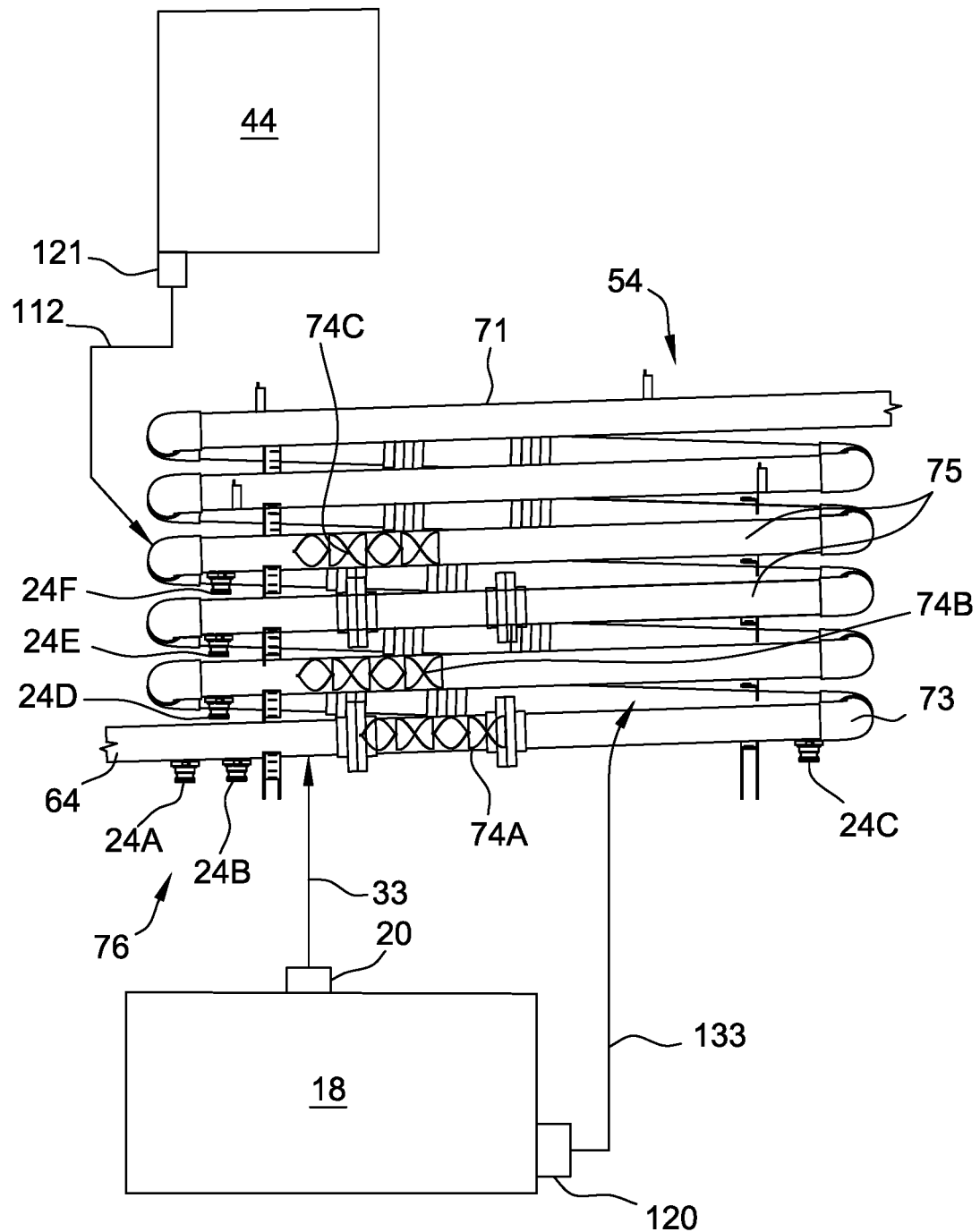
FIG. 6 is a side view of a dosing system for adding one or more additives to the slurry that includes a pipe flocculator for forming flocs in the slurry.

The diluted slurry 53 (FIG. 1) is introduced into a dosing system 54 in which one or more additives 62 are added to the diluted slurry. The diluted slurry 53 passes through pretreatment slurry transfer conduit 64 (FIG. 5) and is introduced into the dosing system 54 (FIG. 6). The dosing system 54 includes a dosing vessel 71. In the embodiment illustrated in FIG. 6, the dosing vessel is a flocculator pipe through which the slurry continually passes (e.g., such as in continuous plug flow system under turbulent conditions). While the dosing vessel 71 may be referred to herein as a flocculator pipe, it should be understood that, in other embodiments, the flocculator is a tank or other vessel. The pipe flocculator includes a tube or pipe through which the slurry passes and in which additive such as one or more coagulants and/or one or more flocculants are added. The pipe flocculator includes several turns 73 that form pipe rungs 75 to allow the flocculator to be more compact and facilitate mixing of additive(s).

The dosing system 54 includes a sensor system 76 for measuring one or more fluid properties of the slurry. A dose of an additive such as coagulant and/or flocculant is controlled by a control system 30 (FIG. 12) based on signals from the sensor system 76. In the embodiment illustrated in FIGS. 6 and 11, the sensor system 76 includes one or more transducer devices 24. In some embodiments, one or more of the transducer devices 24 of the dosing system 54 measures or otherwise determines a parameter related to the particle size distribution (PSD) such as the specific surface area (i.e., surface area per unit mass of sample or per unit volume) of the slurry. Alternatively or in addition, one or more of the transducer devices 24 measures or otherwise determines an electroacoustic parameter of the slurry. In some embodiments, both an electroacoustic parameter and an acoustic parameter (e.g., an acoustic parameter that provides information related to the specific surface area) are measured or otherwise determined by one or more the transducer devices 24.

One or more of the transducer devices 24 may operate by acoustic spectroscopy (e.g., ultrasound attenuation spectroscopy) and one or more of the transducer devices 24 may make an electroacoustic measurement. Without being bound to any particular theory, in accordance with acoustic spectroscopy, attenuation over a range of frequencies may be correlated to the specific surface area of the slurry and/or acoustic reflectivity (i.e., impedance) over a range of frequencies may be correlated to volume fraction (i.e., solids content). According to electroacoustic principles, the electroacoustic current (e.g., below a critical frequency) produced after generation of an acoustic wave may be used to determine zeta potential (e.g., with use of the void fraction and/or the conductivity of the slurry). In some embodiments, one or more of the transducer devices 24 operate only by acoustics (e.g., with the electrode being eliminated).

Figure 7:
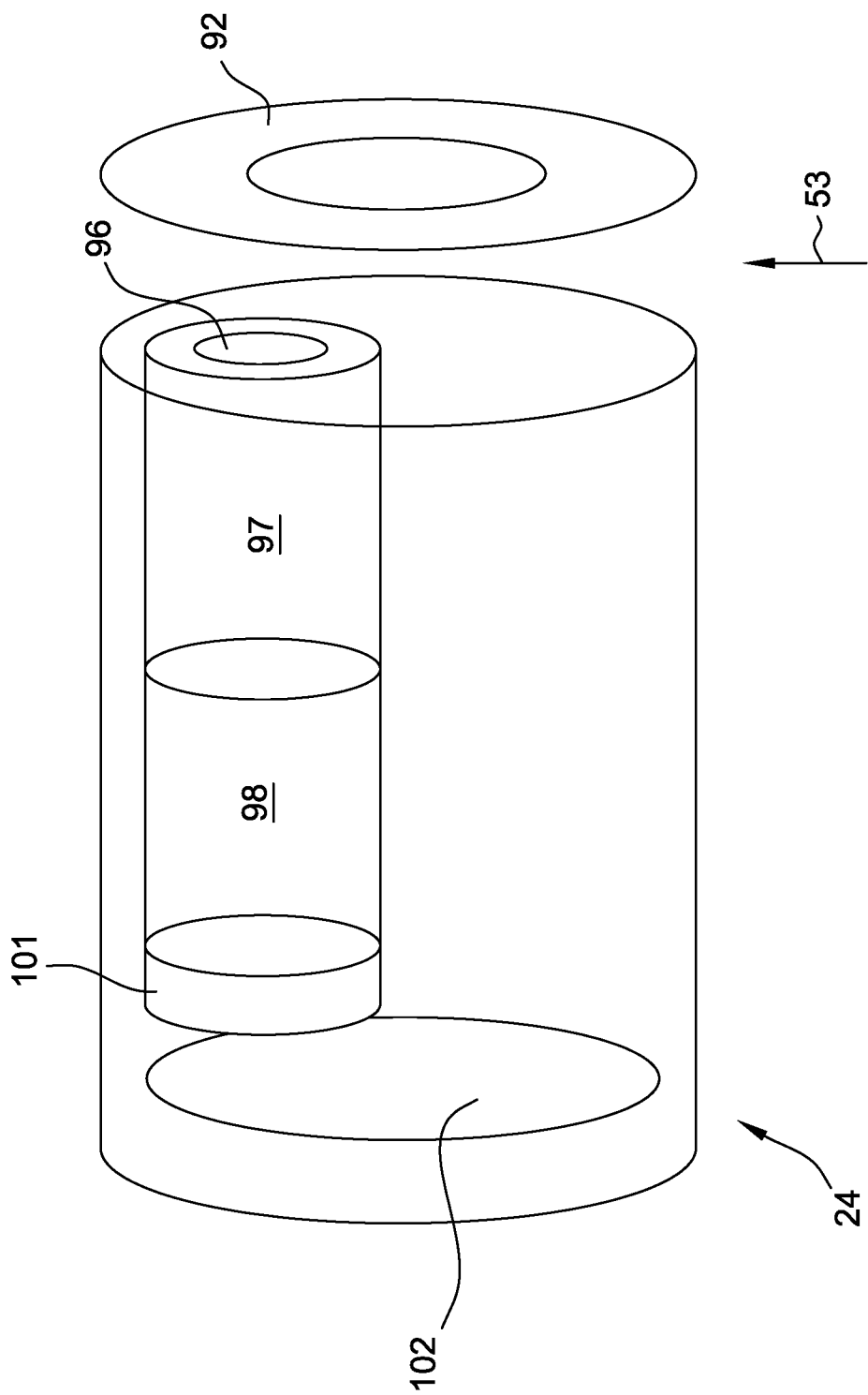
FIG. 7 is a schematic view of a transducer device of the dosing system.
Figure 8:
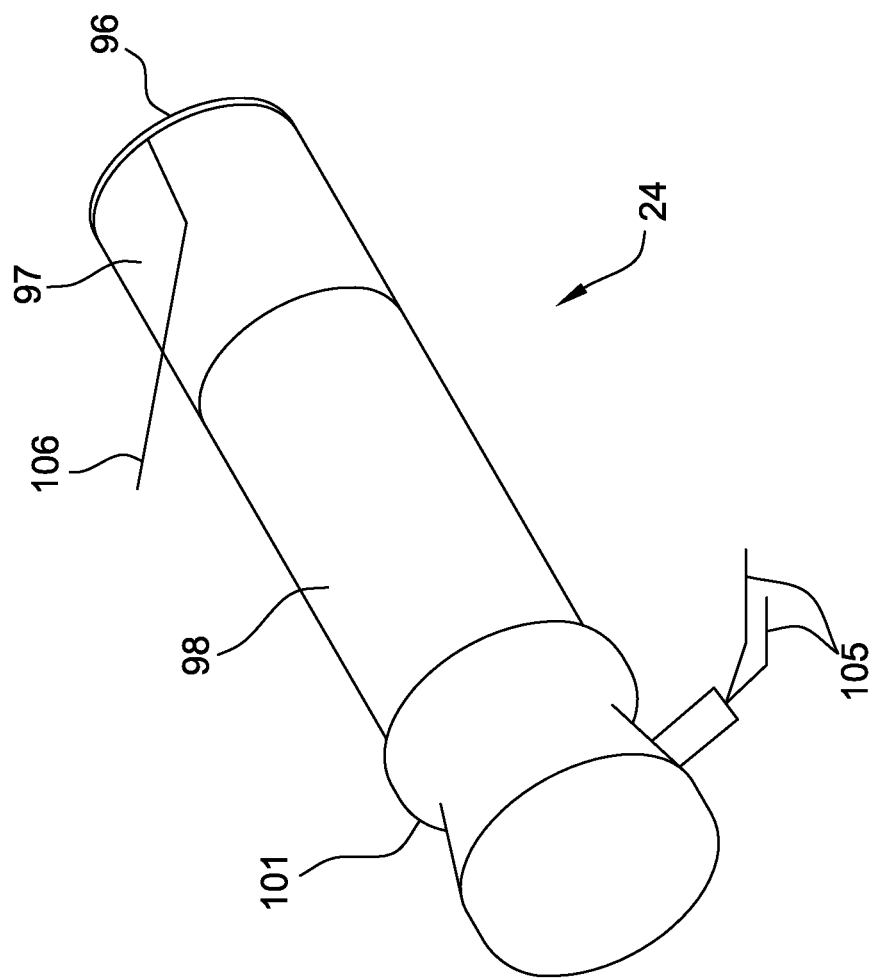
FIG. 8 is a perspective view of a transducer device.

An example transducer device 24 is shown in FIGS. 7 and 8. A transducer 101 (e.g., piezoelectric transducer or "PZT") generates an oscillating acoustic wave and detects reflected pulses (e.g., converts sensed acoustics to a signal). The transducer 101 is communicatively connected to a printed circuit board 102. The transducer device 24 includes a buffer rod 97 and delay rod 98 for transferring the acoustic wave toward the slurry 53. The buffer rod 97 has an acoustic impedance that more closely matches the acoustic impedance of the slurry relative to the delay rod 98. In embodiments in which an acoustic parameter is measured, the transducer device 24 includes an acoustic reflector 92 toward the front of the sensor. The reflector 92 reflects back the acoustic signal toward the transducer 101.

In embodiments in which the transducer device 24 senses an electroacoustic parameter of the slurry, the transducer device 24 includes an electrode 96 for measurement of the electroacoustic parameter. In some embodiments, the electrode 96 is made of titanium. In other embodiments, the electrode 96 may be made of other metal foils, silver-loaded epoxy, or layers of metal or conductive ceramics (e.g., by sputtering).

The electrode 96 may be a film of titanium (e.g., titanium foil) and may have a thickness between 500 nm and 100 µm. In some embodiments the electrode 96 has mass per unit area of less than $0.5 \text{ kg/m}^2$, less than $0.25 \text{ kg/m}^2$, or less than $0.1 \text{ kg/m}^2$ (e.g., $0.01 \text{ kg/m}^2$ to $0.5 \text{ kg/m}^2$).

Figure 9A:
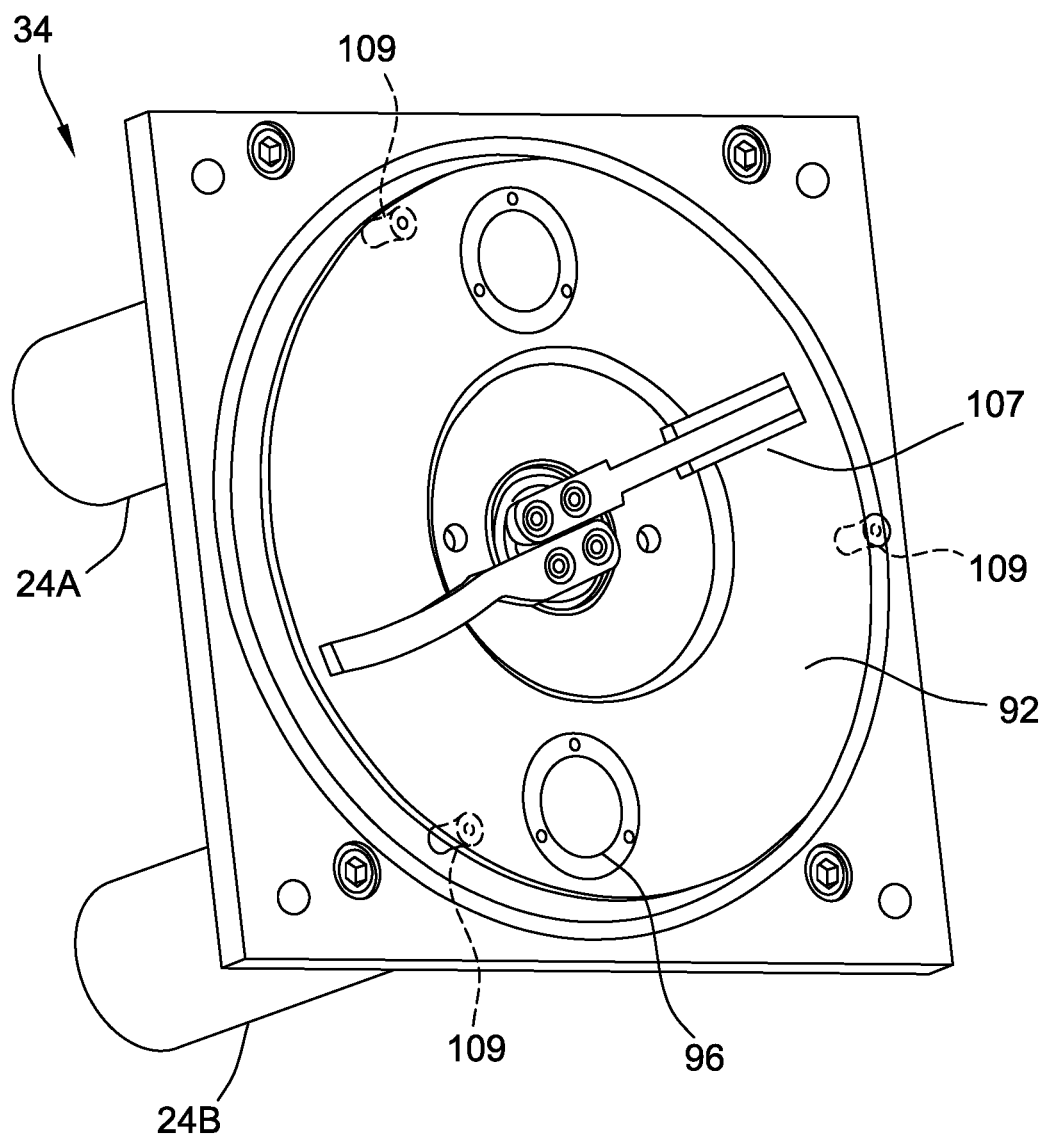
FIG. 9A is a perspective view of a transducer device having a wiper assembly.

The transducer device 24 includes an electrode wire 106 (FIG. 8) connected to the electrode 96 and transducer wires 105 connected to the transducer 101. The electrode 96 may be electrically insulated from surrounding electrical conductors (e.g., by use of a polyetheretherketone (PEEK) sleeve. In some embodiments and as shown in FIG. 9A, the transducer device 24 includes a wiper assembly 107 that moves across the face of the transducer device 24 to bring fresh sample in contact with the transducer device 24. In the embodiment illustrated in FIG. 9A, the transducer device 24 includes mounting pins 109 for connecting the acoustic reflector 92 which is shown in transparent in FIG. 9A. The reflector 92 may be grounded. In some embodiments, the reflector 92 is shaped to reduce turbulence (e.g., has a tear-drop profile). The reflector 92 may have a relatively high mass per unit area (e.g., greater than $5 \text{ kg/m}^2$ or greater than $10 \text{ kg/m}^2$) and/or may have a relatively high acoustic impedance (e.g., greater than 15 MRayl or greater than 30 MRayl). In some embodiments, the reflector 92 is made of, for example, a metal such as stainless steel.

Another embodiment of the transducer device 24 is shown in FIG. 9B. In the embodiment of FIG. 9B, the reflector 92 acts as an electrode. The reflector/electrode 92 may be made of metal such as stainless steel or titanium. The device 24 includes a ground sleeve 116 (e.g., metal sleeve such as a stainless steel sleeve). The ground sleeve 116 and reflector 92 act as electrodes and are connected to the sense resistor 111. The electrical connections to the reflector 92 may be made through mounting pins 109, which may include an insulating surface to limit current leaking from the pins 109, through the slurry and to the ground sleeve 116. The mounting pins 109 are mounted to insulating wall 118. The sleeve 116 may be within the area defined by the mounting pins 109 or may be a larger radius and exterior to the mounting pins 109. In other embodiments, rather than being ground to the ground sleeve 116, the ground connection may be made to a pin in contact with the slurry.

The illustrated transducer devices 24 are generally fixed devices with a fixed distance between the transducer and the slurry (i.e., are not moveable transducers.) The transducer device 24 may be mounted such that the electrode 96 is mounted flush with the inner diameter of the pipe flocculator with the reflector 92 being a fixed distance from the electrode 96. In embodiments in which the transducer device 24 only measures acoustics and the electrode is eliminated, the device 24 may be mounted such that the end of the buffer rod 97 is flush with the pipe with the reflector 92 being a fixed distance from the buffer rod 97.

Figure 10:
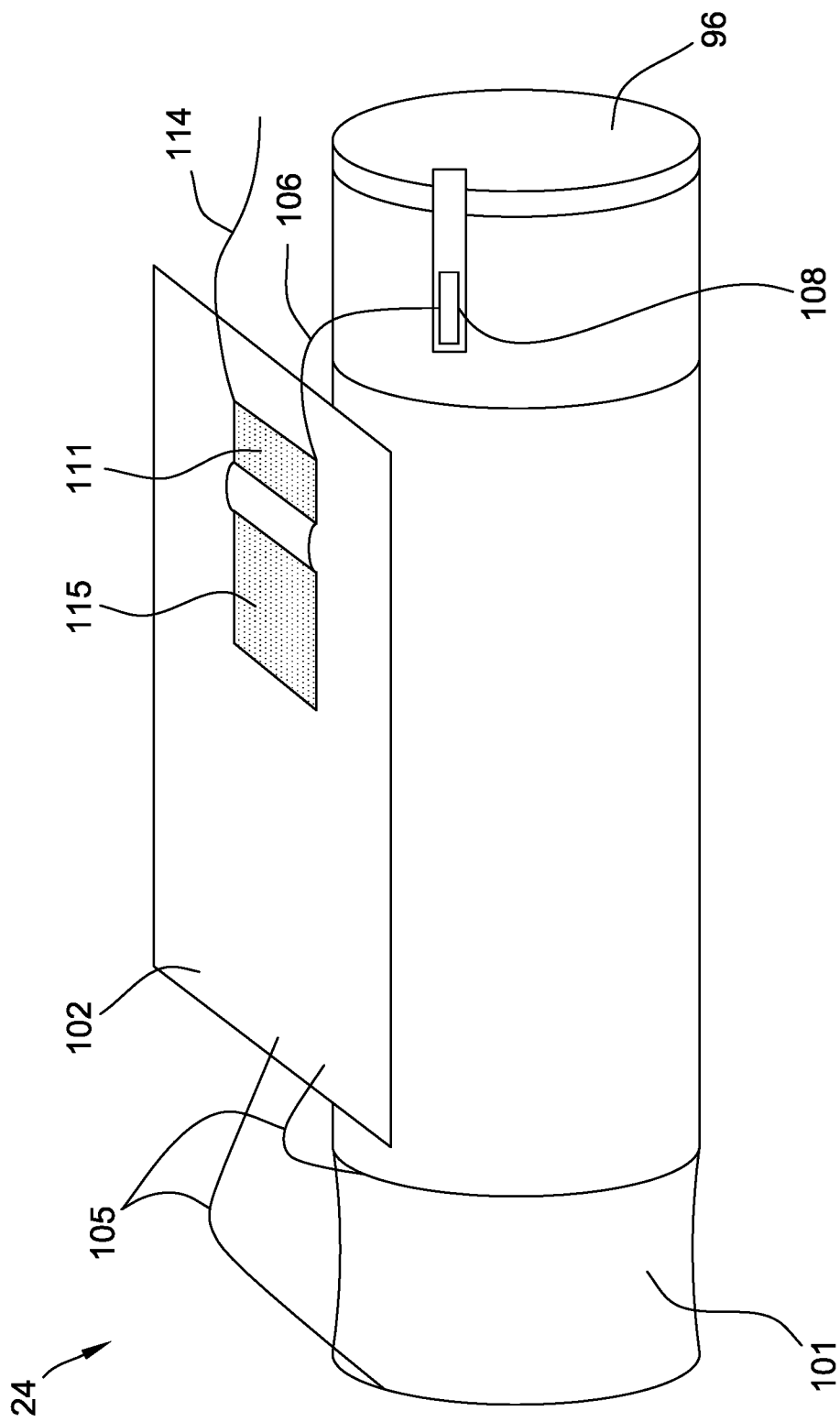
FIG. 10 is a side view of a transducer device showing the electrical connections of the device.

Referring now to FIG. 10, example electrical connections for embodiments of the transducer device 24 that include an electrode 96 are shown. The electrode 96 is connected to a resistor 111 by an electrode wire 106 connected to an electrical contact 108 (e.g., a track of silver) that also is in contact with the electrode 96. The resistor 111 has a set or predetermined resistance and may be mounted to the printed circuit board 102 or the transducer 101. The sense resistor 111 is grounded by use of ground wire 114. The ground wire 114 is generally in electrical contact with the slurry such as by grounding to metal components for mounting the transducer device 24 to the pipe, to the acoustic reflector 92 (FIG. 7), or to a metal pipe or tank (e.g., a tank as used in a batch system). The device 24 includes an amplifier 115 for amplifying the signal from the electrode 96. Transducer wires 105 connect the transducer 101 to the printed circuit board 102.

Figure 17:
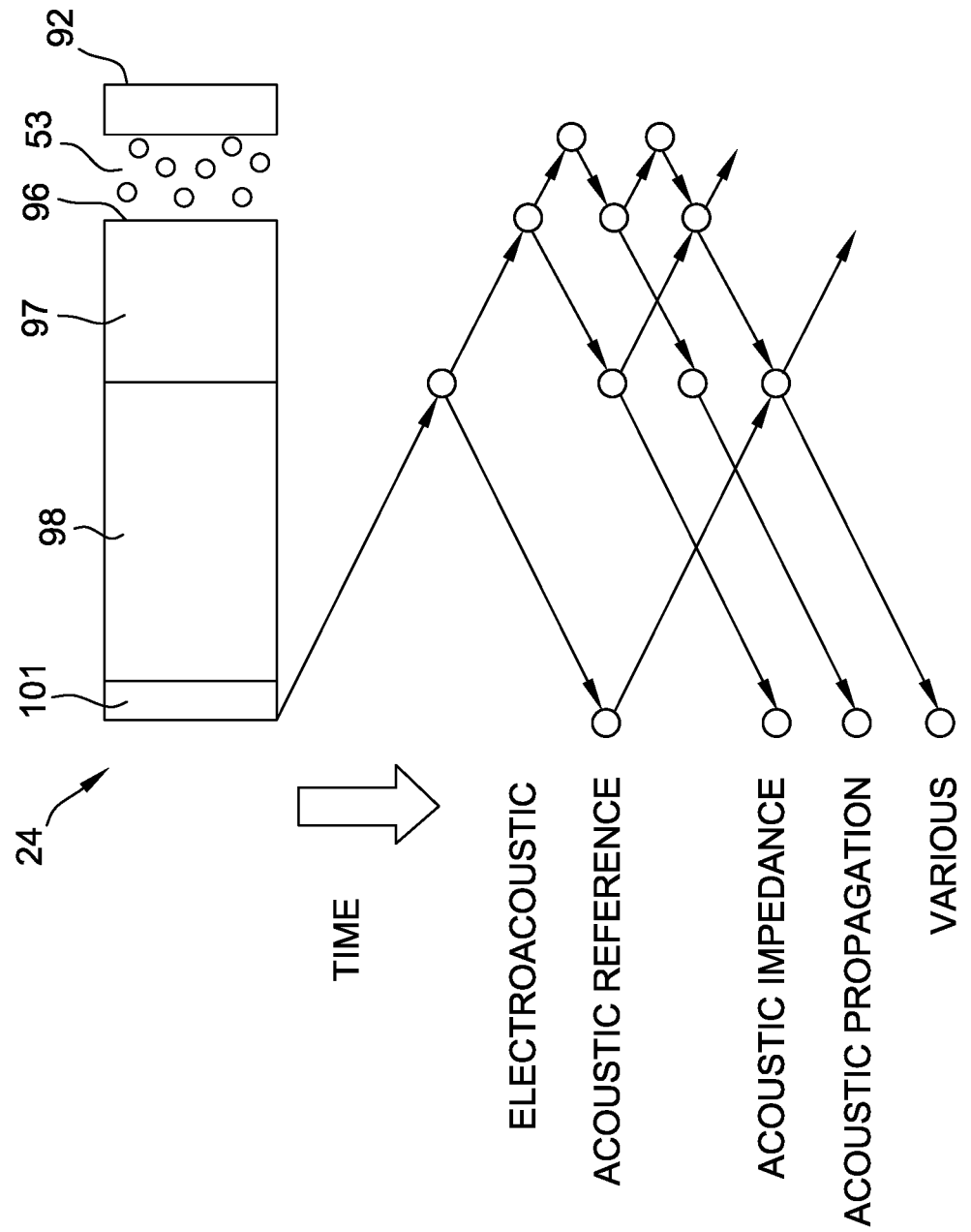
FIG. 17 is a schematic of the timing of pulses in a transducer device.

Referring now to FIG. 17, the signal timing of one or more of the transducer devices 24 is shown. The electroacoustic pulse occurs when the sound wave reaches the slurry because the electrode 96 is on the face of the buffer rod 97. Acoustic pulses are detected upon reflection back to the transducer 101. The device 24 may be configured such that the acoustic signals that reflect back to the transducer 101 through the device 24 are separated in time. FIG. 17 shows propagation of the acoustic pulse and reflection off the acoustic interfaces. The acoustic reference pulse is the pulse reflected off of the delay rod-buffer rod interface and provides the reference for the timing and amplitude of subsequent pulses. The acoustic impedance pulse is the pulse reflected off of the buffer rod-sample interface. The amplitude of the acoustic impedance pulse relative to the reference is dependent on the acoustic impedance of the slurry and may be used to determine the volume fraction. The acoustic propagation pulse is the pulse reflected back (off reflector) after passing through the slurry. The amplitude of the acoustic propagation pulse relative to the impedance signal depends on the attenuation of the sample and may be used to determine specific surface area. Subsequent signals include contributions from multiple paths.

Figure 11:
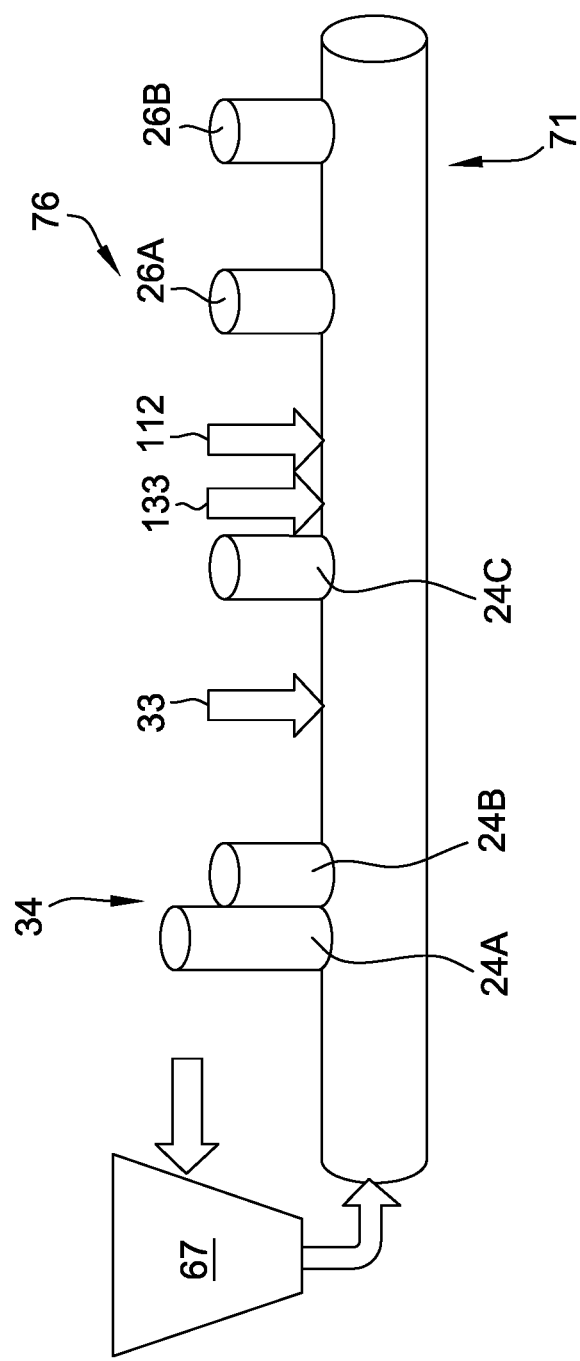
FIG. 11 is a schematic of the dosing system.
Figure 16:
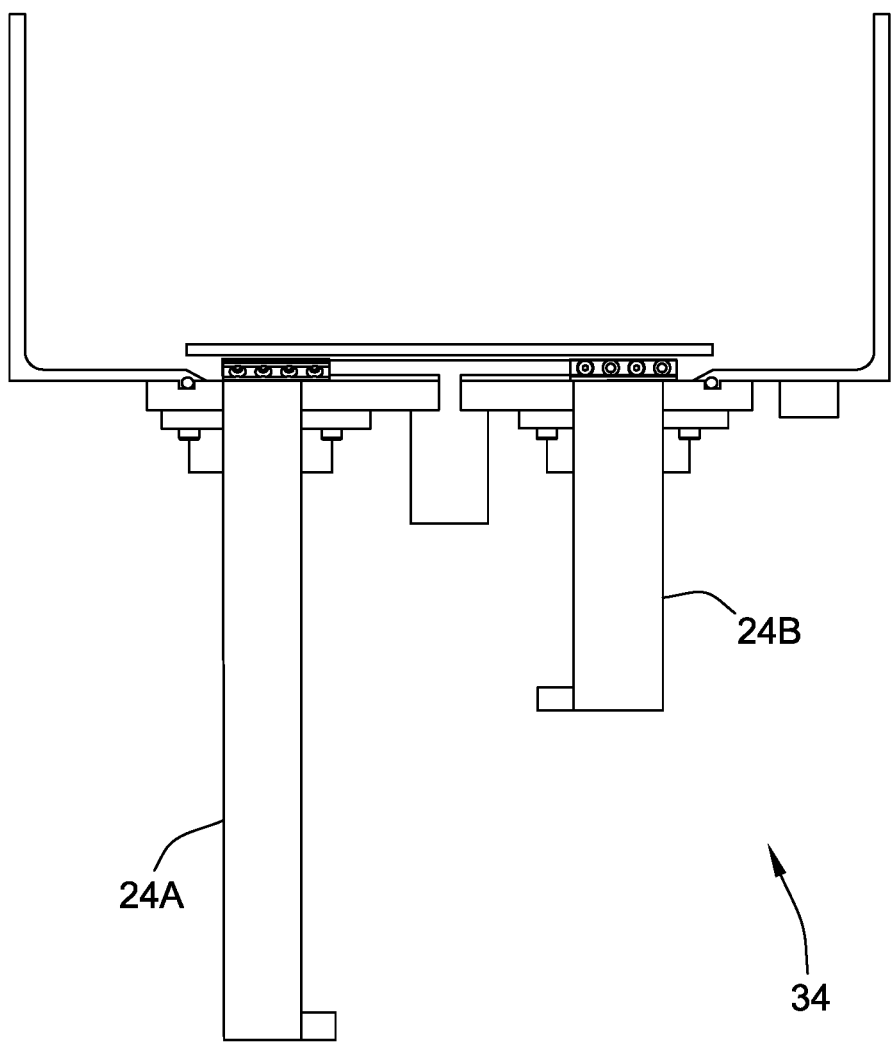
FIG. 16 is a sensor package having first and second transducer devices.

In the embodiment of FIG. 11, the sensor system 76 includes a first transducer device 24A and a second transducer device 24B. The first and second transducer devices 24A, 24B are disposed upstream of where coagulant 33 is added to the pipe flocculator 71. The first and second transducers 24A, 24B may be integrated into a single sensor unit, module or package 34 (e.g., in which certain components are shared such as housing, mounting plates, electronics or the like as shown in FIG. 16) or may be separate components.

In some embodiments, the first and second transducer devices 24A, 24B produce signals based on the acoustics of the slurry after the acoustic wave is generated (i.e., to correlate to a parameter related to the particle size distribution such as the specific surface area). In such embodiments, the first transducer device 24A may operate at a higher frequency than the second transducer device 24B. The second transducer device 24B also includes an electrode to perform electroacoustic sensing (i.e., to correlate to zeta potential such as through measurement of colloidal vibration current (CVI)). It should be noted that while the first transducer device 24A may be described or shown herein as the high frequency transducer device and the second transducer device 24B may be described or shown herein as the low frequency transducer device (i.e., the low frequency sensor is downstream of the high frequency sensor), in other embodiments the first transducer device 24A may be the low frequency transducer device and the second transducer device may be the high frequency device or the sensors may be positioned near or at the same position of the pipe flocculator (e.g., across from each other).

Generally, both of the first and second transducer devices 24A, 24B operate at a center frequency between 0.1 megahertz (MHz) and 10 megahertz (MHz). In some embodiments, the first, high frequency transducer device 24A operates at a center frequency between 3 MHz and 6 MHz (e.g., about 5 MHz center frequency) and the second, low frequency transducer device 24B operates at a center frequency between 0.5 MHz and 3 MHZ (e.g., about 1 MHz center frequency). The center line frequencies of the first and second acoustic waves may differ by at least about 0.5 MHz, at least about 1 MHz, or at least about 2 MHz. The first and second transducers 24A, 24B may be used to determine a parameter related to particle size distribution such as specific surface area by measuring how attenuation varies with frequency.

Figures 15A, 15B:
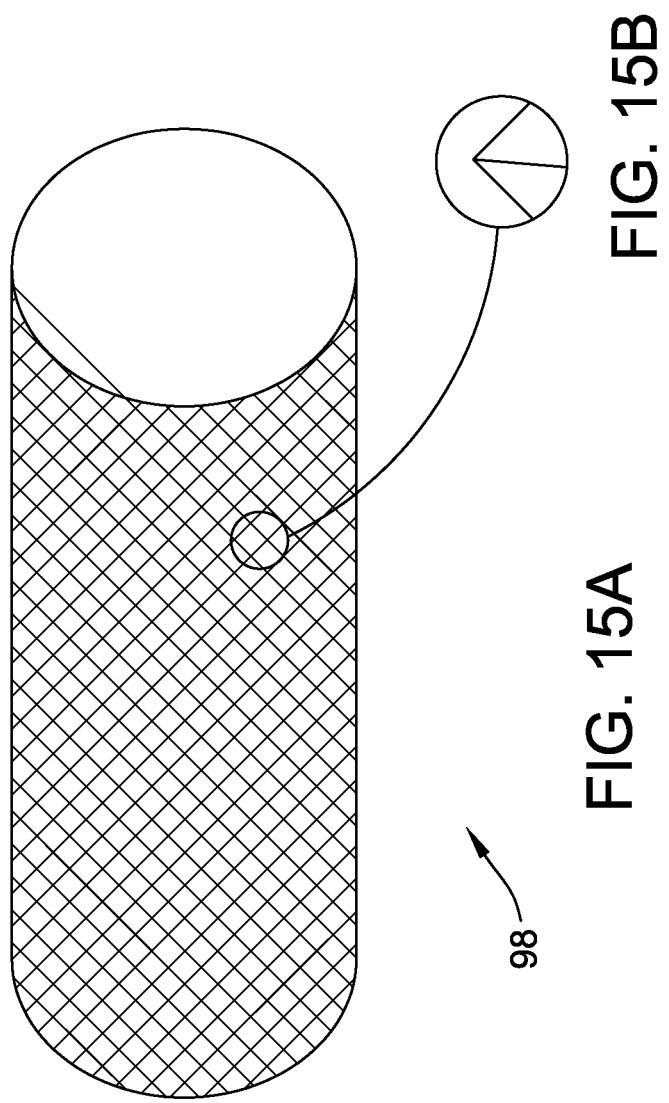
FIG. 15A is a perspective view of a delay tube of a transducer device.
FIG. 15B is a perspective view of a pyramidal knurl of the delay tube.

The materials chosen for the transducer devices 24 may depend on the desired frequency of the sensor. For lower frequency applications (e.g., 1 MHZ), the buffer rod 97 and delay rod 98 may be made of relatively light weight polymer such as REXOLITE (a tightly specified polystyrene) from C-Lec Plastics, Inc. (Philadelphia, PA) or may be made from acrylic. For relatively higher frequencies (e.g. about 5 MHz center frequency), the delay rod 98 may be aluminum with a knurled surface (FIG. 15). In some embodiments, the size of the knurling (i.e., peak to peak distance may be similar (e.g., within 33%, within 20%, within 10% or within 5%) to the length of the center wavelength of the transducer (e.g., 1.2 mm for a 5 MHz frequency). The knurling may have a suitable depth such as about half the wavelength at the center frequency (e.g., within 33%, within 20%, within 10% or within 5% of 0.5 times the center wavelength). The knurling pattern may be a diamond pattern as shown in FIG. 15A or straight or angled knurling may be used. In some embodiments and as shown in FIG. 15B, the knurling is pyramidal (i.e., pointed without flat tops) Such knurled rods may be produced by cut-type knurlers. The buffer rod 97 may be made of relatively light weight polymer such as REXOLITE or acrylic.

As noted above, one or both of the first and second transducer devices 24A, 24B may include an electrode for measuring an electroacoustic property of the slurry. In some embodiments, only the low frequency transducer device 24B includes an electrode. The first and second transducer devices 24A, 24B collectively provide volume fraction (as determined through acoustic impedance), electroacoustic properties (e.g., CVI), and conductivity of the slurry which may be used to determine the zeta potential of the slurry. In some embodiments, the volume fraction/density measurement is determined upstream in dilution such as through sensing system 48 (FIG. 5). The dilution system 45 may dilute to a predetermined volume fraction with the predetermined volume fraction being used (e.g., with CVI and conductivity) to determine the zeta potential of the slurry.

In some embodiments, the rate at which coagulant 33 (i.e., coagulant dose) is added to the slurry is based at least in part on the parameter related to the particle size distribution (e.g., specific surface area) as measured by the first and second transducer devices 24A, 24B and is based at least in part on the zeta potential (e.g., magnitude of the zeta potential based on CVI) measured by the second transducer device 24B. The rate at which flocculant 112 is added may also be based at least in part on the specific surface area as measured by the first and second transducer devices 24A, 24B.

The sensor system 76 also includes a third transducer device 24C for measuring the effect of coagulant addition. The third electroacoustic sensor 24C measures an electroacoustic parameter (e.g., CVI) to determine the zeta potential (e.g., CVI) of the slurry after coagulant has been added and mixed into the slurry. The rate at which coagulant 33 is added may also be controlled based at least in part on the zeta potential (e.g., CVI) as measured by the third transducer device 24C through feedback control.

In some embodiments, a second dose of coagulant 133 (e.g., rate at which the second dose is introduced) is added to the dosing vessel 71 based on the determined zeta potential as measured by the third transducer device 24C.

In the case of transducer devices that measure an electroacoustic parameter (e.g., low-frequency, second transducer device 24B and/or third transducer device 24C), generally at least one of the transducer devices measures the conductivity of the slurry. A correction for the conductivity of the slurry may be determined by applying a signal to the sense resistor 111 (FIG. 10) and slurry in series and measuring the signal across the sense resistor 111. Conductivity measurement may be made before or after measurement of colloidal vibration current.

Figure 9C:
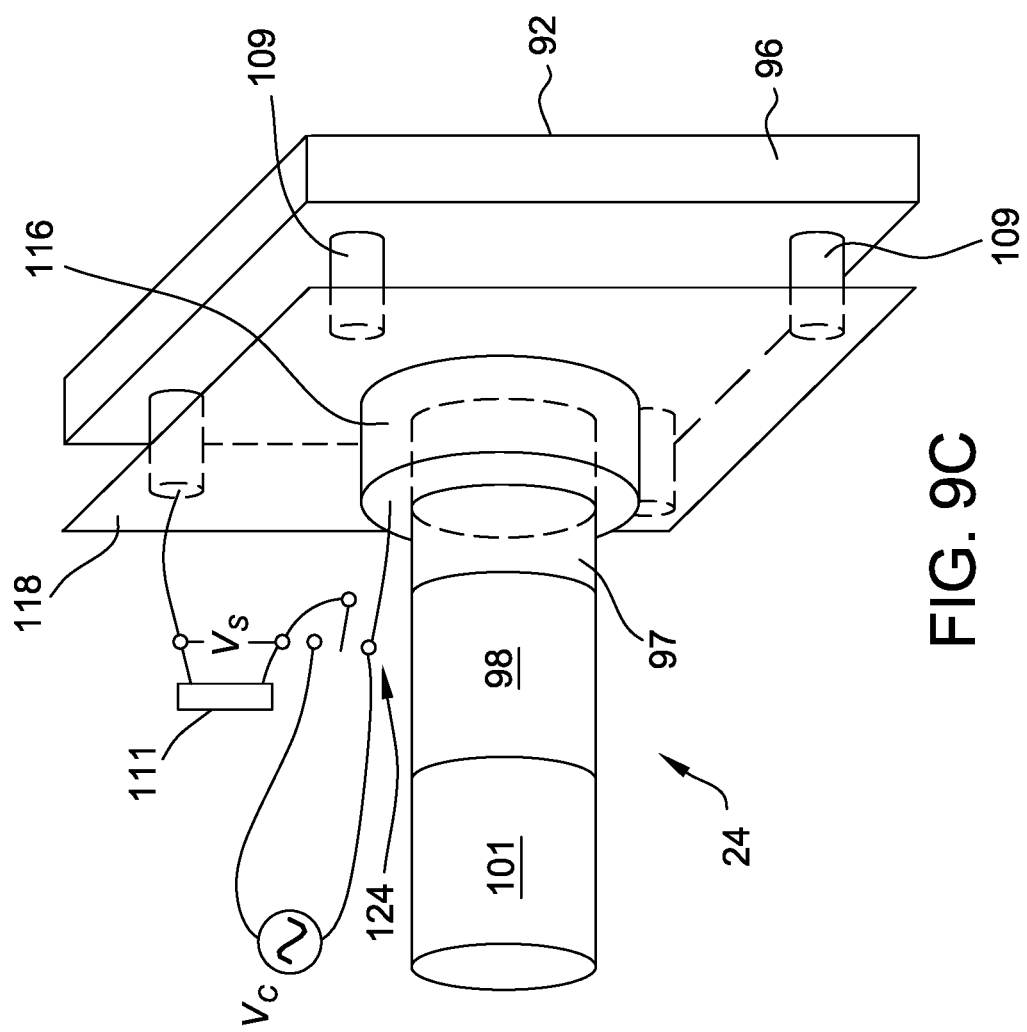
FIG. 9C is a perspective view of a transducer device in which the reflector is an electrode with a switch for conductivity measurement.
Figure 18:
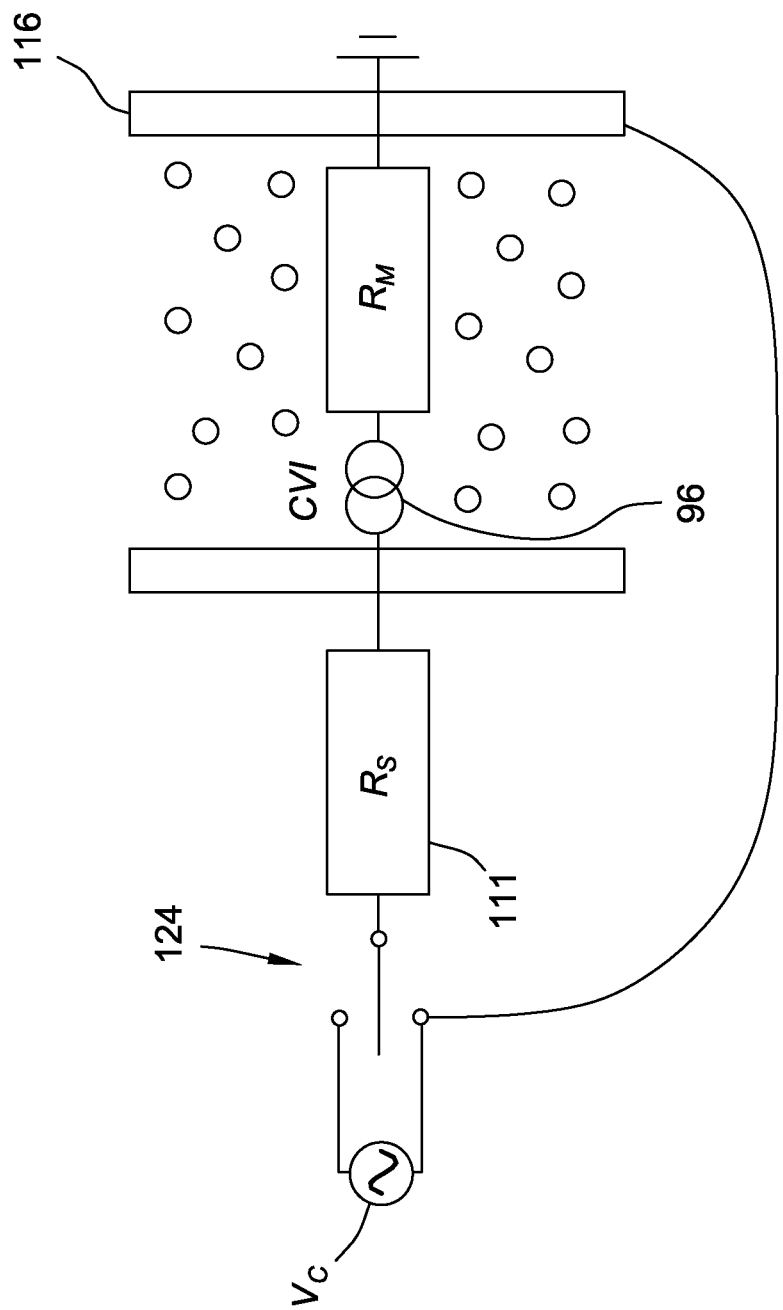
FIG. 18 is a schematic of a circuit for electroacoustic and conductivity sensing.

Referring now to FIG. 9C and FIG. 18, the same electrode may be used to measure (1) an electroacoustic parameter such as colloidal vibration current and (2) conductivity of the slurry. To use the same electrode, the sense resistor 111 is connected to a voltage source $V_c$ and a switch 124. In the illustrated embodiment, the switch is a three-pole, two-way switch. Other types of switches may be used in other embodiments. The controller 29 (FIG. 12) can selectively move the switch 124 between positions. For example, the controller 29 may move the switch 124 to a first position (i.e., the lower position in the circuit of FIG. 9C), to allow the sense resistor 111 to be grounded to the slurry via the connection to the ground sleeve 116. With the switch in this position, the colloidal vibration current passes through the sense resistor 111 and the sensed voltage $V_s$ is measured by the controller as a metric of the CVI.

When the switch 124 is in the second position (i.e., raised position in the circuit of FIG. 9C), the voltage source $V_s$ is able to pass current through the sense resistor 111 and the slurry in series through the electrode 92 and the voltage generated by that current is monitored as a measure of the conductivity of the fluid. Voltage $V_c$ may be a low-level voltage such as 1 to 5 volts and may be an AC signal with substantially the same frequency used for CVI measurement. As shown in FIG. 9C, the switch 124 may be part of a transducer device 24 in which the acoustic reflector 92 acts as an electrode. It should be noted that the circuits shown in FIG. 9C and FIG. 18 are exemplary and other circuits and arrangements for measuring conductivity and/or an electrostatic parameter such as CVI may be used unless stated otherwise.

The first, second and third transducer devices 24A, 24B, 24C described above that determine zeta potential should be distinguished from streaming current sensors. In embodiments in which an electroacoustic zeta potential sensor is used, the sensor should be distinguished from sensors that operate by electrophoretic light scattering.

The sensor system 76 may also include one or more floc sensors 26A, 26B (e.g., optical sensor such as back-reflectance sensors) that detect formed flocs. The rate at which flocculant 112 is added to the pipe flocculator 71 is based at least in part on output from the floc sensor 26 (e.g., feedback from optical sensors). The sensor system 76 may include two or more floc sensors (e.g., first and second floc sensors 26A, 26B as shown) along the length of the pipe flocculator 71. In such embodiments, dosing of flocculant 112 may be controlled such that larger flocs (which may give larger changes to back-reflectance) only appear toward the terminal end of the pipe flocculator 71 (e.g., within the last 20%, last 15%, last 10% or within the last 5% of the pipe).

In some embodiments, the rate at which coagulant 33 is added is based on a combination of (1) the specific surface area as determined from the first and second transducer devices 24A, 24B, (2) the zeta potential as calculated (e.g., by correlation) from the electroacoustic parameter measured by second transducer device 24B and (3) the zeta potential as calculated (e.g., by correlation) from the electroacoustic parameter measured by the third transducer device 24C. A second dose of coagulant 133 may be added to lower the calculated zeta potential to at or near zero. Alternatively or in addition, the rate at which flocculant 112 is added is based on a combination of (1) the specific surface area as determined from output of the first and second transducer devices 24A, 24B and (2) output from the first floc sensor 26A (and optionally also a second floc sensor 26B and optionally an additional floc/optical sensor in the downstream separation system 60).

While the dosing system 5 has been shown and described having first, second and third transducer devices 24A, 24B, 24C, in other embodiments the system has less or more than three transducer devices (e.g., one, two, three, four, five, six or more transducer devices may be used).

In the embodiment illustrated in FIG. 6, the system 54 includes a first static mixer 74A disposed downstream of the point at which the first dose of coagulant 33 is added and upstream of the third transducer device 24C. The system 54 also includes a second static mixer 27B downstream of the point at which the second dose 133 of coagulant is added and upstream of the point at which flocculant 112 from flocculant source 44 is added. The dosing system 54 also includes a third static mixer 74C disposed downstream of where flocculant 112 is added to mix flocculant throughout the slurry. In other embodiments, the system 54 may include more or less static mixers.

Coagulant 33 is added to the dosing vessel 71 from a coagulant source 18 (e.g., coagulant feed tank). Coagulant 33 may be fed to the dosing vessel 71 by a coagulant feed system 20 (e.g., dosage meter or pump) in fluid communication with the coagulant feed tank 18 and dosing vessel 71 (with an optional second dose 133 being added by second coagulant feed system 120). The coagulant feed system 20 (and flocculant feed system 121 described below) may include any suitable device for adding material including centrifugal pumps, displacement pumps (e.g., syringe-style pump), diaphragm pumps, peristaltic pumps, gear-style pumps, vane pumps and progressive cavity pumps.

Flocculant 112 is added to the dosing vessel 71 from the flocculant source 44 (e.g., flocculant feed tank) and may be fed to the pipe flocculator by a flocculant feed system 121 (e.g., dosage meter or pump) in fluid communication with the flocculant feed tank 44 and dosing vessel 71. In some embodiments, the flocculant feed system 121 includes two flocculant pumps and/or flocculant feed tanks to allow two different flocculants to be added to the dosing vessel 71. The flocculant feed tank 44 and coagulant feed tank 18 may be any suitable container for holding coagulant or flocculant including a dedicated tank, transportable totes or tanks, barrels or bins. Coagulant or flocculant may be premixed in the tank 18, 44 (added as a liquid or solid) or a ready-to-use formulation may be used.

Generally, suitable coagulants include materials that act to destabilize the slurry suspension through surface charge neutralization. Exemplary coagulants that may be used to modify the slurry (e.g., change the zeta potential) include hydrolyzing metal salts (e.g., aluminum sulfate, ferric chloride or sulfate), pre-hydrolyzed metal salts (e.g., polyaluminum chloride or sulfate or polyiron chloride) or synthetic polymers including cationic polymers (e.g., epi-DMA, aminomethyl polyacrylamide, polyalkylene, polyamines or polyethylenimine).

Suitable flocculants that may be used include materials that cause suspended particles to aggregate and form flocs. Examples of flocculant include synthetic cationic polymers (e.g., polydiallyldimethyl chloride, polydimethyl aminomethyl polyacrylamide, polyvinylbenzyl or trimethyl ammonium chloride), synthetic neutral polymers (polyacrylamides), synthetic anionic polymers (hydrolyzed polyacrylamides, polyacrylic acid, polystyrene sulfonate or polyacrylates), natural polymers (e.g., sodium alginate, chitosan or starch) and inorganic flocculants (e.g., aluminum chloride, aluminum chlorohydrate, aluminum chlorohydroxide, bentonite or kaolite clays).

An example control system 30 for controlling dosing of additive is shown in FIG. 12. The transducer devices 24 send one or more signals to the controller 29. The controller 29 adjusts the coagulant feed system 20 (and optional second dose coagulant feed system 120) and the flocculant feed system 121 based on the output from the transducer devices 24 and the optical sensors 26. The system 30 may control other devices such as the dosing system (e.g., water feed pump 39) based on signals from level sensor 46, load cells 49, and flow sensor 51. Alternatively or in addition, the controller 29 may control the first and second separation units 25, 57 of the pretreatment system 14. It should be noted that while a single controller 29 is shown in the control system 30, the system 30 may include more than one controller for controlling different portions of the dewatering system 1 (FIG. 1).

The controller 29 that controls the dosing of additive based at least in part on a signal from the transducer devices 24 and/or optical sensors 26 includes a processor and a memory. The processor processes the signals received from various sensors, selectors and control devices of the system. The memory stores instructions that are executed by the processor.

The controller 29 may be a computer system. Computer systems, as described herein, refer to any known computing device and computer system. As described herein, all such computer systems include a processor and a memory. However, any processor in a computer system referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel. The controller 29 may be implemented on hardware such as laptops, wireless devices, smartphones, workstations, or mainframe or network computer.

The term processor, as used herein, refers to central processing units, microprocessors, microcontrollers, reduced instruction set circuits (RISC), application specific integrated circuits (ASIC), logic circuits, and any other circuit or processor capable of executing the functions described herein. The above are examples only, and are thus not intended to limit in any way the definition and/or meaning of the term "processor."

In one embodiment, a computer program is provided to enable controller 29, and this program is embodied on a computer readable medium. In an example embodiment, the computer system is executed on a single computer system, without requiring a connection to a server computer. In some embodiments, the computer program is in C-code and compiled to a target operating system such as with a Sauer controller.

In a further embodiment, the computer system is run in a Windows® environment. In yet another embodiment, the computer system is run on a mainframe environment and a Linux® operating system or other UNIX® server environments. In yet a further embodiment, the computer system is run in an Apple® environment (Apple OS X or Apple iOS). In yet other embodiment, the computer system is run on a Google Android™ platform. Alternatively, the computer system is run in any suitable operating system environment. The computer program is flexible and designed to run in various different environments without compromising any major functionality. In some embodiments, the computer system includes multiple components distributed among a plurality of computing devices. One or more components may be in the form of computer-executable instructions embodied in a computer-readable medium.

The computer systems and processes are not limited to the specific embodiments described herein. In addition, components of each computer system and each process can be practiced independent and separate from other components and processes described herein. Each component and process also can be used in combination with other assembly packages and processes.

Figure 13A:
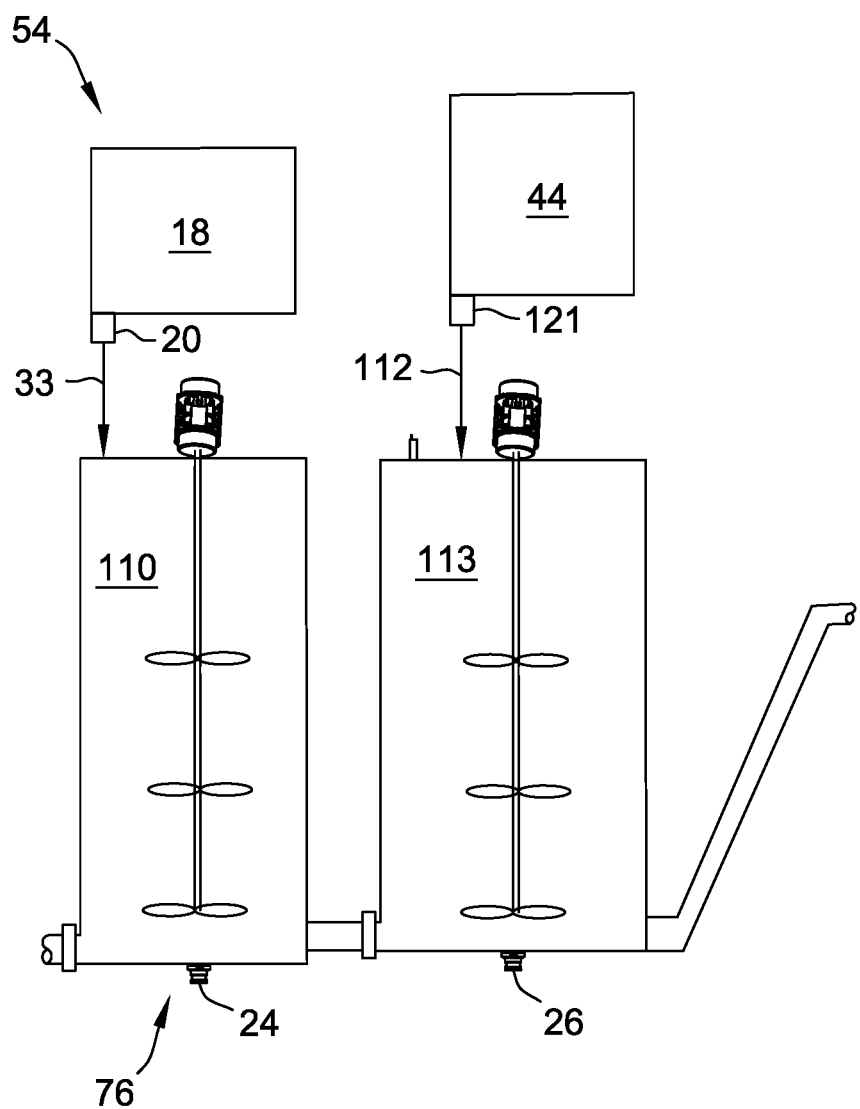
FIG. 13A is a side view of an embodiment of a dosing system that includes batch mixing tanks for forming flocs in the slurry.
Figure 13B:
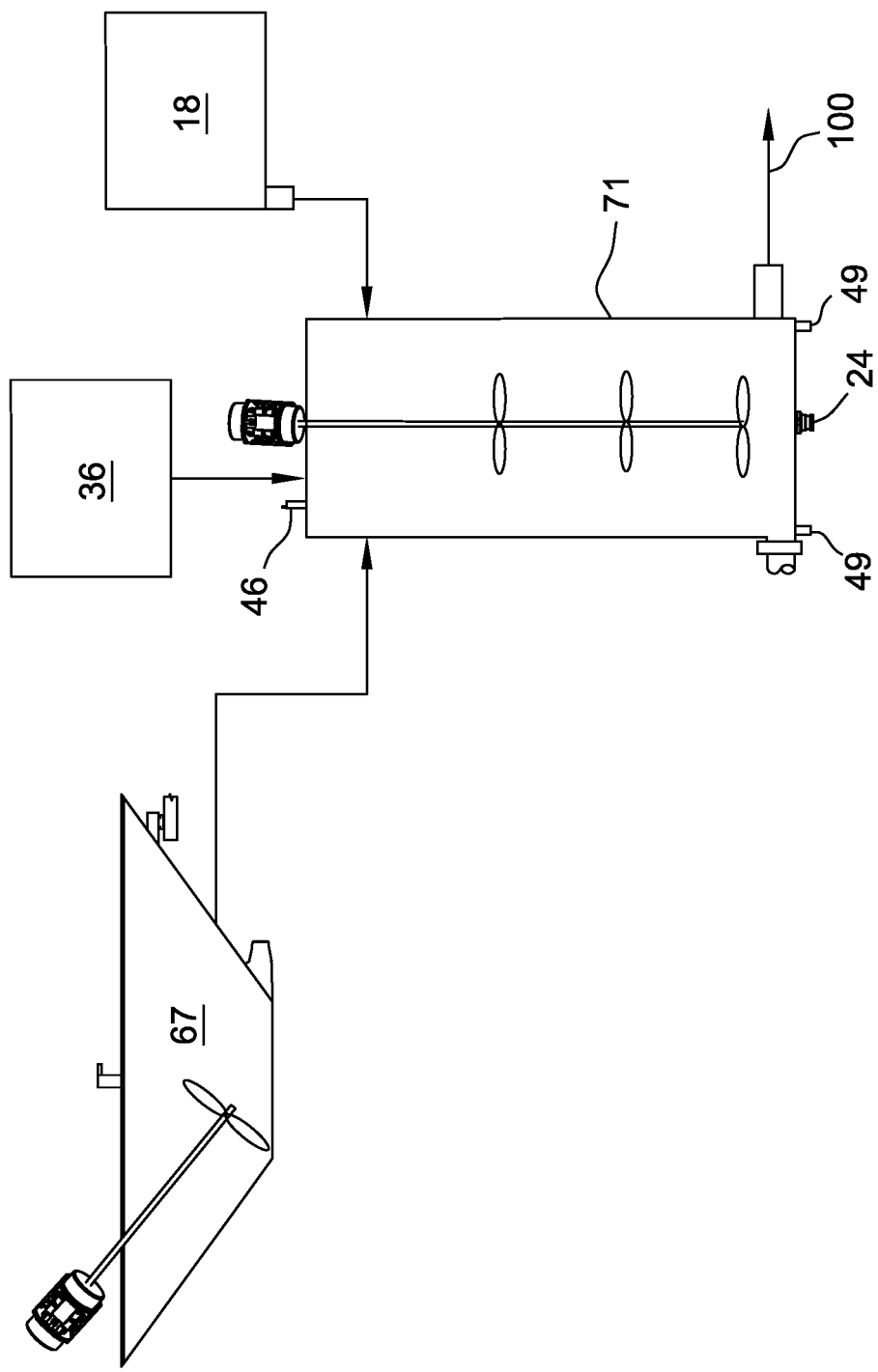
FIG. 13B is a side view of an embodiment of a dosing system that includes a batch mix tank for diluting the slurry and adding coagulant.
Figure 13C:
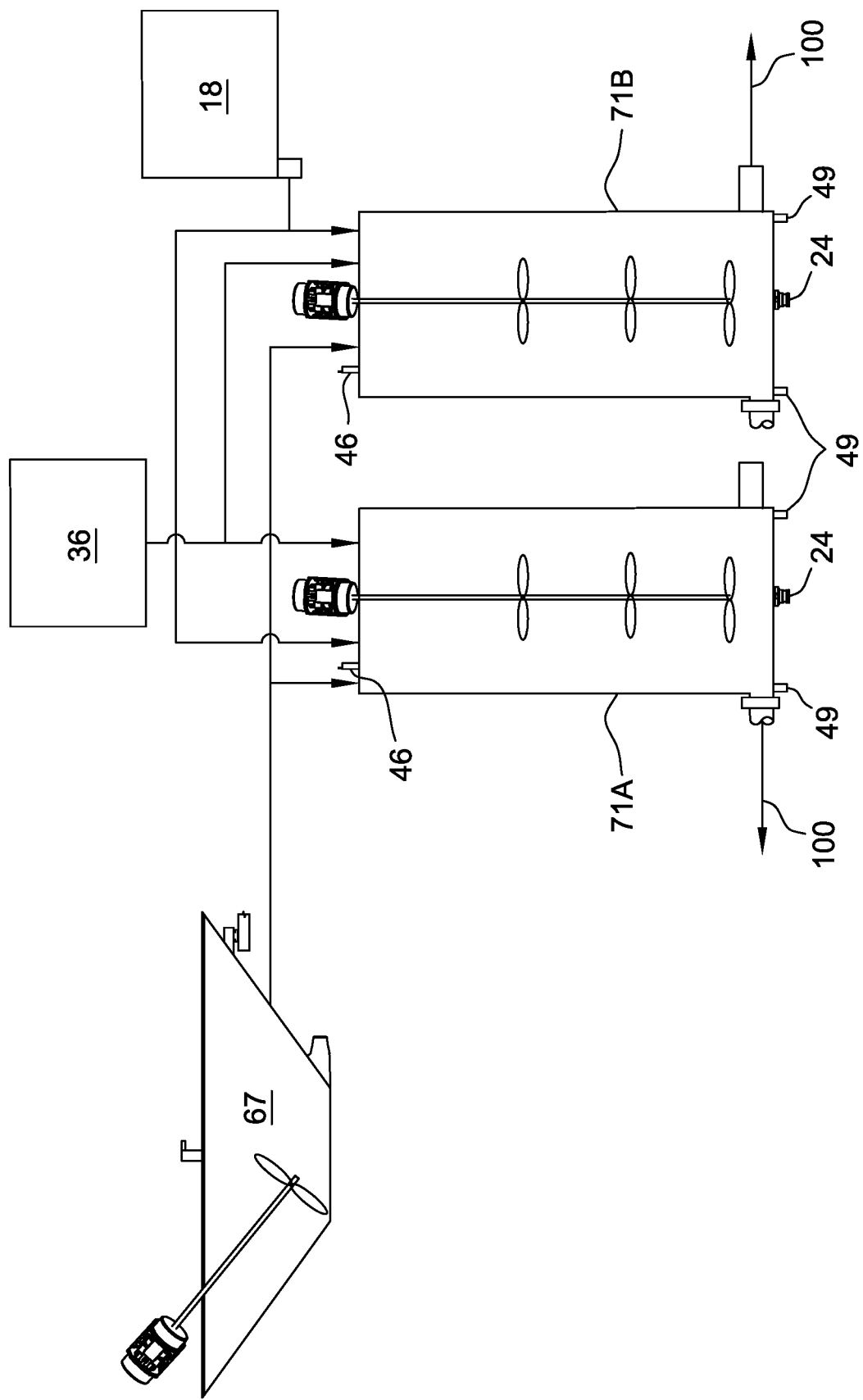
FIG. 13C is a side view of an embodiment of a dosing system that includes batch mix tanks for diluting the slurry and adding coagulant.

Another embodiment of the dosing system 54 is shown in FIG. 13A. The dosing system 54 includes a coagulant batch mix tank 110. The system 54 includes a sensor system 76 having one or more transducer devices 24 which may operate as described above in the system illustrated in FIG. 6. Coagulant 33 may be added in one or more doses until the zeta potential of the slurry decreases from an initial level to a dosed level (e.g., to at or near zero which is known as the "isoelectric point" of the slurry, after which the sign of the zeta potential changes and the absolute value of the zeta potential increases with addition of more coagulant). In such embodiments, the sign of the zeta potential is monitored to detect a change in the sign. Alternatively or in addition to measurement of the zeta potential sign, in some embodiments, the magnitude of the zeta potential is measured.

After addition of coagulant, the coagulated slurry is introduced into a flocculant mix tank 113. Flocculant 112 is then added to the flocculant mix tank 113 to produce floc and/or settle-out solids.

In other embodiments, the dosing system 54 is operated in a semi-continuous mode in which slurry is added to a first tank and slurry is coagulated and flocculated in the first tank while fresh slurry is added to the second tank. After the first tank is processed, the slurry of the second tank may be processed to produce flocs while the first tank is filled.

Figure 13D:
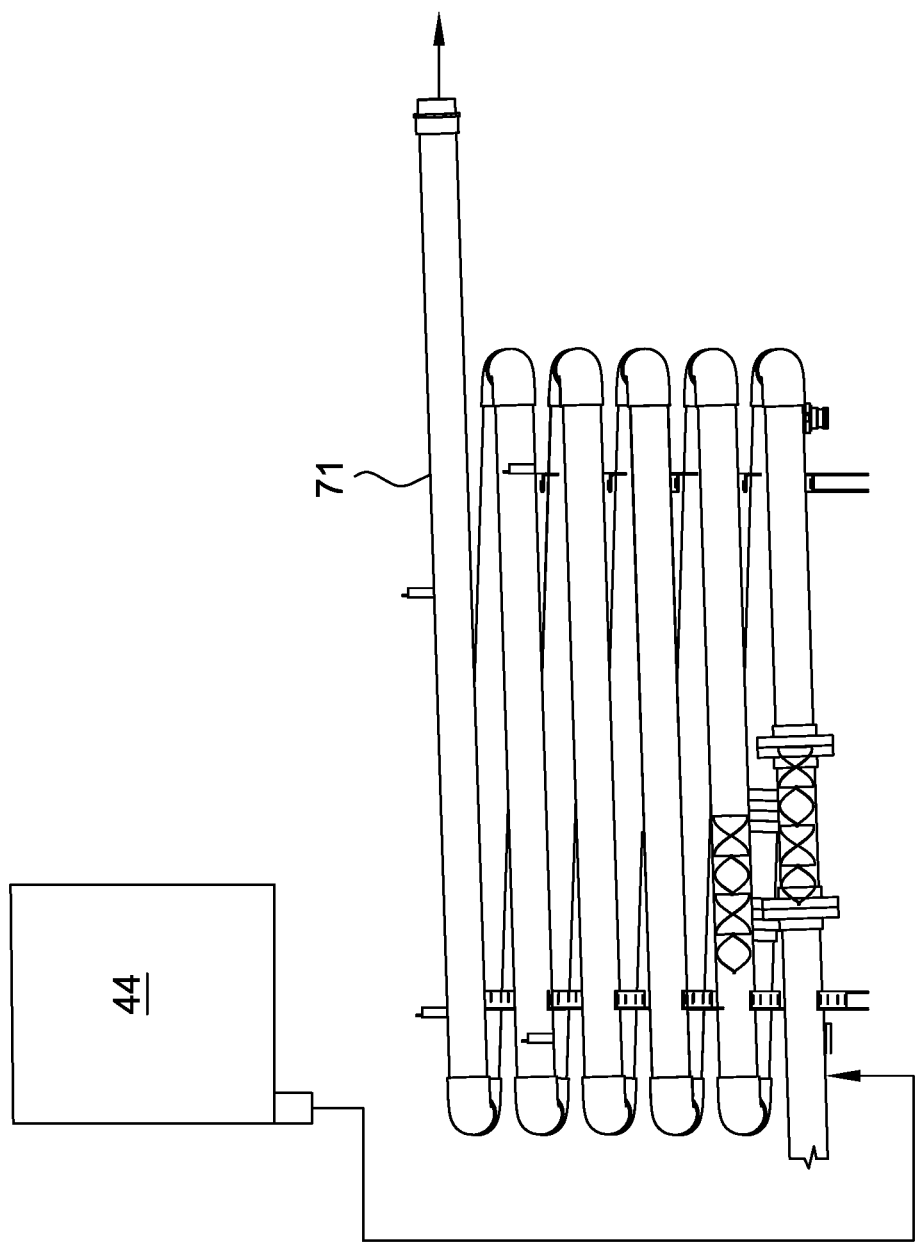
FIG. 13D is a side view a dosing vessel for adding flocculant.

In some embodiments, dosing of coagulant 18 and dilution with water may occur in the same dosing vessel (s) 71. As shown in FIG. 13B, the dosing vessel 71 is a batch tank. Dilution water 36 may be added based on the solids content as calculated by signals from load cells 49 and level sensor 46. One or more transducer devices 24 (e.g., first and second devices 24A, 24B that operate at different frequencies to measure specific surface area and/or that measure an electroacoustic parameter) may be used to determine to coagulant dose. For example, coagulant 18 may be added in one or more doses until the calculated zeta potential approaches or is at zero. Treated slurry 100 may be introduced into a flocculation vessel such as the pipe flocculator shown in FIG. 13D (or flocculant may be added before a centrifuge used to separate solids downstream).

In some embodiments and as shown in FIG. 13C, dilution with water 36 and addition of coagulant 18 is performed in a semi-continuous mode in which two or more batch tanks are diluted and dosed with coagulant in succession to continuously generate coagulant treated slurry. Each batch tank 71A, 71B may include load cells 49, level sensors 46 and transducer devices 24 for dilution and for dosing of coagulant 18. Treated slurry 100 may be introduced into a flocculation vessel such as the pipe flocculator shown in FIG. 13D (or flocculant may be added before a centrifuge used to separate solids downstream).

Figure 13E:
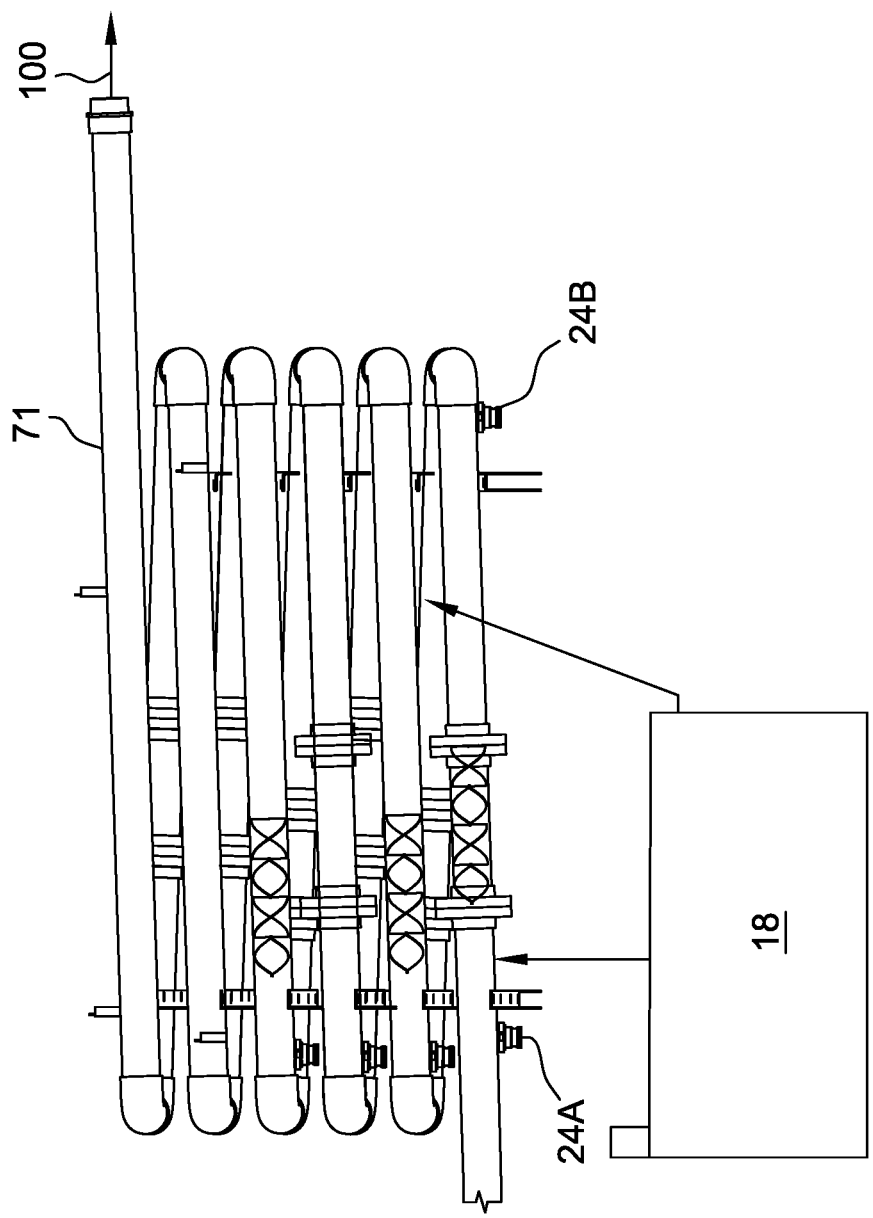
FIG. 13E is a side view a dosing vessel for adding coagulant.

In some embodiments and as shown in FIG. 13E, coagulant 18 may be added in two or more doses in a dosing vessel such as a coagulator pipe 71. The treated slurry 100 may be flocculated in a separate flocculation vessel (or flocculant may be added before a centrifuge used to separate solids downstream).

Separation System

Figure 14:
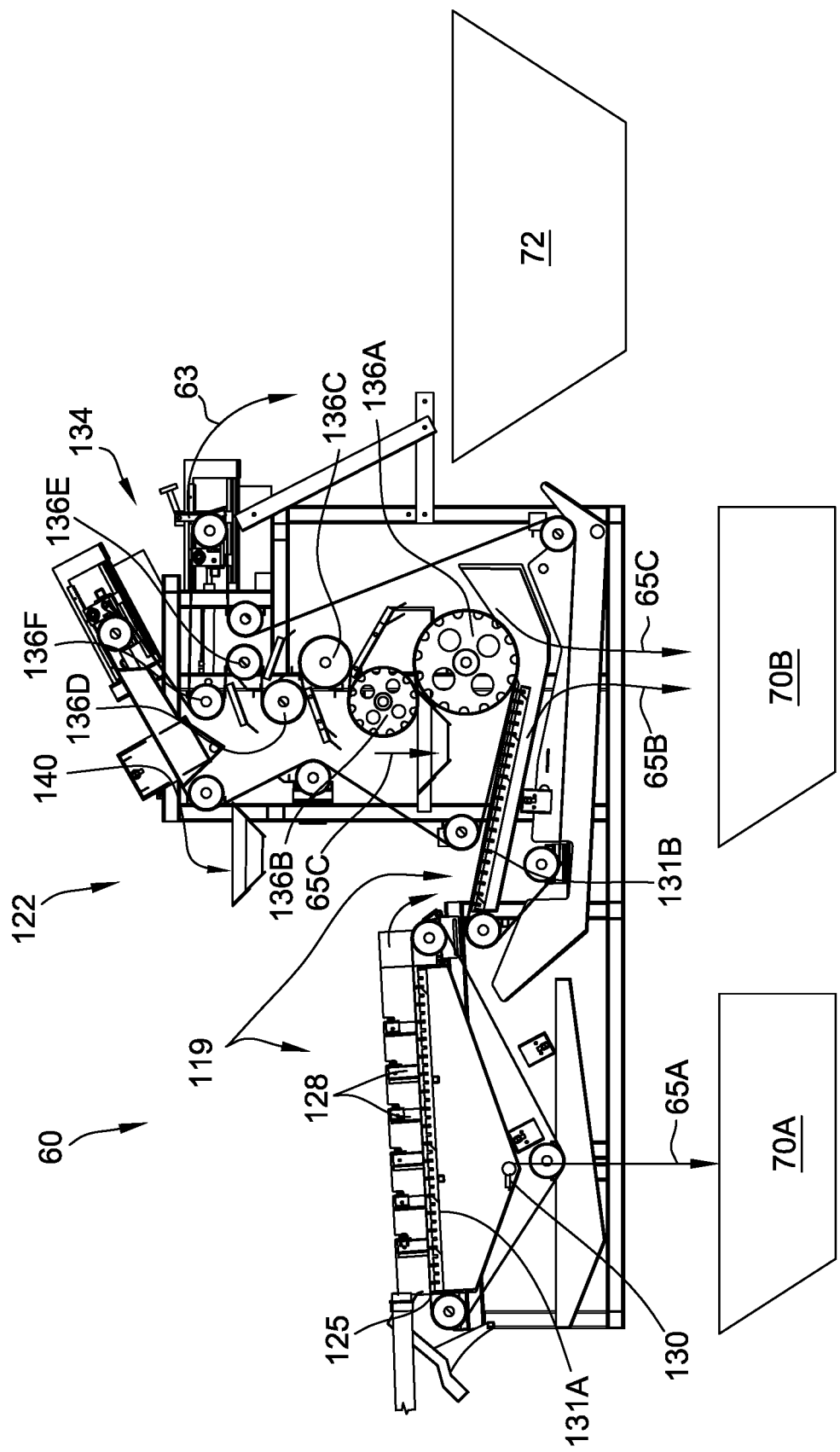
FIG. 14 is a side view of a separation system having a filter press for removing flocs from the treated slurry.

The additive-treated slurry 59 is introduced to a separation system 60 such as the example system of FIG. 14. The separation system 60 illustrated in FIG. 14 includes a belt filter press 122. The belt filter press 122 includes a gravity zone 119 in which a liquid fraction passes through one or more filter belts. The gravity zone 119 illustrated in FIG. 14 includes first and second portions 131A, 131B (separate conveyors). A first liquid fraction 65A falls from the first portion 131A of the gravity zone. The first portion 131A of the gravity zone 119 may include diverters 128 that move the slurry over the belt 125 as the belt 125 moves to promote dewatering of the treated slurry. A second liquid fraction 65B is discharged through the second portion 131B of the gravity zone 119. The first and second liquid fractions 65A, 65B may be collected in one or more collection vessels such as collection vessels 70A, 70B.

An optical sensor 130 may measure one or more optical parameters of the first liquid fraction 65A that pools below the first portion 131A of the gravity zone 119. The optical sensor 130 may provide feedback for flocculant addition.

After being discharged from the gravity zone 119 of the filter press 122, the remaining solids are transferred to a filter belt press zone 134 in which the solids are pressed against rollers 136 (e.g., sandwiched between two belts and pressed against a series of rollers 136) to remove a third liquid fraction 65C from the slurry. The third liquid fraction falls to the second collection vessel 70B. The belt of the filter press 122 may be cleaned with wash water 140 which may be recycled.

A solid fraction 63 is discharged from the separation system 60 into another collection vessel 72. The solid fraction 63 may be disposed by re-use in construction or may be landfilled. The liquid fraction 65 may be disposed by re-use in drilling operations, discharged to a wastewater treatment system or used in other applications such as in dust control, irrigation or other non-potable uses. The liquid fraction 65 is depleted in solids relative to the pretreated slurry 16. In some embodiments, at least about 90 wt %, at least about 95 wt % or even at least about 98 wt % (e.g., from about 90 wt % to about 100 wt % of from about 95 wt % to about 100 wt %) of the solids in the pretreated slurry 16 are removed by the dosing system 54 and separation system 60.

Other embodiments of the separation system 60 may include alternative separation devices for dewatering the slurry including, for example, separation by sedimentation, centrifugation (e.g., decanter centrifuge, basket centrifuge, screen centrifuge or hydrocyclones), other filtration (e.g., filter press, filter bags or vacuum filtration such as filter cake filtration) and/or by thermal drying. In some embodiments in which one or more centrifuges are used, flocculant may be added prior (e.g., immediately prior) to the slurry entering the centrifuge.

Compared to conventional systems and methods for dewatering slurries, the systems and methods of the present disclosure have several advantages. In embodiments in which additive (s) is dosed continuously, less space may be used than in batch dosing systems. By automating dosing of additive (s), the system may adjust dosing when slurries having different soil types are processed (e.g., without having to perform jar tests or the like). In embodiments that use a pipe flocculator, the pipe flocculator allows for addition and mixing of coagulant and produces relatively less shear which reduces break-up of flocs.

By monitoring acoustic properties of the slurry through one or more transducers, a parameter related to the particle size distribution (e.g., specific surface area) of the slurry may be determined which may be used for more effective dosing of flocculant. In embodiments in which the sensing system includes two transducer devices that operate at different center frequencies (e.g., a first at about 1 MHz and a second at about 5 MHz), a relatively large measurement range (e.g., 0.5-5 MHZ) may be used with less variation in signal amplitude (e.g., as compared to a single transducer that operates at a frequency of 1 MHz and at odd harmonics such as 3 MHz and 5 MHZ). In embodiments in which the low-frequency transduce device (e.g., 0.5 MHz to 3 MHZ) includes the electrode, measurement of the electroacoustic parameter may be improved compared to electroacoustic measurement at relatively high frequency (e.g., above 3 MHZ). In embodiments in which a relatively high frequency transducer is used (e.g., about 5 MHz), use of a knurled aluminum delay rod reduces dispersion. By monitoring an electroacoustic property of the slurry such as zeta potential (e.g., by measurement of CVI) with a transducer that is an electroacoustic transducer, the system is well adapted to monitor the zeta potential in relatively high solid content slurries such as earthen slurries. Such electroacoustic sensors generate an oscillating acoustic pressure wave or an oscillating electric field voltage that are capable of being transmitted through such high solid content slurries.

By monitoring the solids content of the earthen slurry that is introduced into the pipe flocculator, the rate at which dilution water is added may be adjusted to produce a slurry with a consistent solids concentration (i.e., specific gravity). This allows a consistent amount of additive (e.g., flocculant to be added to the slurry) and allows downstream processing (e.g., separation of solids from the slurry) to be better tuned to improve separation. Dilution of the slurry prior to coagulant addition allows for better mixing and contact of coagulant and slurry during dosing which reduces coagulant usage (e.g., diluting to less than about 40 wt % solids). Dilution allows high solids content slurries to be better processed.

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment (s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing [s] shall be interpreted as illustrative and not in a limiting sense.

What is claimed is:

1. A system for dosing a slurry to remove suspended solids, the system comprising:
   a dosing vessel for adding a dose of additive to the slurry;
   one or more transducer devices that generate an acoustic wave that is transferred to the slurry, the one or more transducer devices detecting (1) an acoustic property of the slurry and (2) an electroacoustic property of the slurry;
   an additive control system for controlling the dose of one or more additives added to the dosing vessel, the additive control system comprising:
      an additive feed system for introducing the dose of additive to the dosing vessel; and
      a controller configured to:
         calculate a specific surface area of the slurry based at least in part on the acoustic property of the slurry; and
         control the dose of additive added to the dosing vessel from the additive feed system based at least in part on (1) the specific surface area of the slurry and (2) the electroacoustic property of the slurry, wherein the one or more transducer devices detect the electroacoustic property of the slurry after generation of the acoustic wave.

2. The system as set forth in claim 1 wherein the the electroacoustic property is the colloidal vibration current or colloidal vibration potential.

3. The system as set forth in claim 2, wherein the controller is configured to calculate the zeta potential of the slurry based at least in part on the colloidal vibration current or colloidal vibration potential.

4. The system as set forth in claim 3 wherein the additive is a coagulant, the dose of coagulant added to the dosing vessel being based on at least in part on the specific surface area and zeta potential.

5. A system for dosing a slurry to remove suspended solids, the system comprising:
a dosing vessel for adding a coagulant to the slurry;
a first transducer device that generates a first acoustic wave in the slurry at a first center frequency and that measures attenuation of the first acoustic wave;
a second transducer device that generates a second acoustic wave in the slurry at a second center frequency and that measures attenuation of the second acoustic wave, the first center frequency being different from the second center frequency; and
a coagulant control system for controlling a dose of coagulant added to the dosing vessel, the coagulant control system comprising:
a coagulant feed system for introducing coagulant to the dosing vessel; and
a controller configured to:
calculate a specific surface area of the slurry based at least in part on the attenuation of the first and second acoustic waves sensed by the first and second transducer devices; and
control the dose of coagulant added to the dosing vessel from the coagulant feed system based at least in part on the specific surface area of the slurry, wherein at least one of the first and second transducer devices measures an electroacoustic parameter of the slurry after generation of at least one of the first acoustic wave and the second acoustic wave.

6. The system as set forth in claim 5 wherein the electroacoustic parameter is a colloidal vibration current or colloidal vibration potential.

7. The system as set forth in claim 6 wherein the controller is configured to control the dose of coagulant added to the dosing vessel based at least in part on the colloidal vibration current or colloidal vibration potential.

8. The system as set forth in claim 5 further comprising:
a flocculant control system for controlling a dose of flocculant added to the dosing vessel, the flocculator control system comprising:
a flocculator feed system for introducing flocculant to the dosing vessel; and
a controller configured to control a dose of flocculant added to the dosing vessel from the flocculant feed system based at least in part on the attenuation of the first and second acoustic waves sensed by the first and second transducer devices.

9. The system as set forth in claim 8 further comprising an optical detector configured to detect flocs in the slurry, the controller being configured to control a dose of flocculant added to the dosing vessel from the flocculant feed system based at least in part on output from the optical detector.

10. The system as set forth in claim 5 wherein the dosing vessel is a pipe flocculator through which slurry continually flows.

11. The system as set forth in claim 10 comprising a third transducer device that generates a third acoustic wave, the third transducer device being downstream of a point at which coagulant is added to the pipe flocculator.

12. The system as set forth in claim 11 wherein the third transducer device measures an electroacoustic parameter of the slurry after generation of the third acoustic wave.

13. The system as set forth in claim 11 wherein the dose of coagulant is a rate at which coagulant is added to the pipe flocculator.

14. The system as set forth in claim 5 wherein the first and second transducer devices are each configured to produce the first acoustic wave and the second acoustic wave, respectively, at a frequency between 0.1 MHz and 10 MHz.

15. The system as set forth in claim 5 wherein the center line frequencies of the first and second acoustic waves differ by at least about 1 MHz.

16. A method for automatically dosing a slurry flowing through a vessel with coagulant, the method comprising:
generating a first acoustic pulse in the slurry by a first transducer device;
measuring a first colloidal vibration current produced in the slurry after generation of the first acoustic pulse;
calculating a first zeta potential of the slurry based on, at least in part, the first colloidal vibration current;
adding coagulant to the slurry downstream of the first transducer device;
generating a second acoustic pulse in the slurry by a second transducer device that is downstream of coagulant addition;
measuring a second colloidal vibration current produced in the slurry after generation of the second acoustic pulse from the second transducer; and
calculating a second zeta potential of the slurry based on, at least in part, the second colloidal vibration current;
determining the specific surface area of the slurry based on one or more measured acoustic parameters of the slurry after generation of the first or second acoustic pulse;
wherein a rate at which coagulant is added to the slurry is based at least in part on (1) the calculated first zeta potential, (2) the calculated second zeta potential, and (3) the specific surface area of the slurry.

17. The method as set forth in claim 16 wherein the rate at which coagulant is added to the slurry includes a dose amount, the dose amount being a total dose of coagulant added to the slurry.

18. The method as set forth in claim 16 wherein the rate at which coagulant is added to the slurry includes a dose amount, the dose amount being a first dose of coagulant added to the slurry, the method further comprising adding a second dose of coagulant.

19. The method as set forth in claim 18 wherein a rate at which the second dose of coagulant is added is based at least in part on the calculated second zeta potential.

* * * * *